United States Patent
Kondo et al.

(10) Patent No.: US 10,543,446 B2
(45) Date of Patent: Jan. 28, 2020

(54) HONEYCOMB STRUCTURE

(71) Applicant: NGK INSULATORS, LTD., Nagoya (JP)

(72) Inventors: Takahiro Kondo, Nagoya (JP); Yasushi Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 78 days.

(21) Appl. No.: 15/854,149

(22) Filed: Dec. 26, 2017

(65) Prior Publication Data

US 2018/0207571 A1   Jul. 26, 2018

(30) Foreign Application Priority Data

Jan. 20, 2017   (JP) ................ 2017-008903

(51) Int. Cl.
  *B01D 46/24* (2006.01)
  *C04B 35/478* (2006.01)
  *F01N 3/022* (2006.01)
  *C04B 35/565* (2006.01)

(52) U.S. Cl.
  CPC ..... *B01D 46/2455* (2013.01); *B01D 46/2448* (2013.01); *B01D 46/2474* (2013.01); *C04B 35/478* (2013.01); *C04B 35/565* (2013.01); *F01N 3/0222* (2013.01); *B01D 2046/2477* (2013.01); *B01D 2046/2481* (2013.01); *B01D 2046/2492* (2013.01)

(58) Field of Classification Search
  CPC .......... B01D 46/2455; B01D 46/2466; B01D 2046/2477; C04B 2237/708
  USPC .................................. 428/116, 118
  See application file for complete search history.

(56) References Cited

U.S. PATENT DOCUMENTS

| | | | |
|---|---|---|---|
| 6,669,751 B1 | 12/2003 | Ohno et al. | |
| 2007/0125053 A1 | 6/2007 | Matsubara et al. | |
| 2009/0247399 A1* | 10/2009 | Mizutani | B01D 53/944 502/178 |
| 2011/0240205 A1 | 10/2011 | Kamei | |
| 2014/0116016 A1* | 5/2014 | Mizuno | B01D 46/2425 55/523 |
| 2014/0287190 A1* | 9/2014 | Yamada | C04B 38/0016 428/117 |

(Continued)

FOREIGN PATENT DOCUMENTS

| | | |
|---|---|---|
| JP | 5097237 B2 | 12/2012 |
| WO | 01/23069 A1 | 4/2001 |
| WO | 2004/096414 A1 | 11/2004 |

*Primary Examiner* — Tri V Nguyen
(74) *Attorney, Agent, or Firm* — Burr & Brown, PLLC

(57) ABSTRACT

A honeycomb structure including prismatic columnar honeycomb segments and a bonding layer, wherein the bonding layer has rows in each of which bonding layer portions each disposed between two honeycomb segments arranged to face each other are arranged to extend from one point of a peripheral edge of a bonded body of the honeycomb segments to the other point thereof, in a cross section, the bonding layer of each of the-rows is disposed so that among the bonding layer portions arranged in one direction, an outermost circumference bonding layer portion and at least one of the other bonding layer portions are not superimposed on each other on an extension line of the one direction, and a ratio of shift of side surfaces of adjacent honeycomb segments to a length of one side of a side surface of honeycomb segments having the same cross-sectional shape is 10% or less.

4 Claims, 14 Drawing Sheets

(56) References Cited

U.S. PATENT DOCUMENTS

2015/0252701 A1\* 9/2015 Ito .................... B01D 46/2448
428/116

\* cited by examiner

HONEYCOMB STRUCTURE

The present application is an application based on JP 2017-008903 filed on Jan. 20, 2017 with Japan Patent Office, the entire contents of which are incorporated herein by reference.

BACKGROUND OF THE INVENTION

Field of the Invention

The present invention relates to a honeycomb structure of a segmented structure, and more particularly, it relates to a honeycomb structure of a segmented structure which has an excellent thermal shock resistance and is capable of effectively inhibiting damages on a bonding layer due to shearing stress.

Description of the Related Art

In recent years, awareness toward environmental problems has grown in the whole society, and in a technical field in which fuel is burnt to generate power, various technologies have been developed to remove toxic components such as nitrogen oxides from an exhaust gas generated during the burning of the fuel. For example, various technologies have been developed to remove toxic components such as nitrogen oxides from the exhaust gas emitted from a car engine. During such removal of the toxic components in the exhaust gas, it is general to cause a chemical reaction in the toxic gas by use of a catalyst, thereby changing the component into another comparatively non-toxic component. Further, as a catalyst carrier onto which the catalyst for exhaust gas purification is to be loaded, a honeycomb structure has been used.

Furthermore, the exhaust gas emitted by combustion of an internal combustion engine includes a toxic gas of nitrogen oxides or the like as well as particulate matter such as soot. Hereinafter, the particulate matter will occasionally be referred to as "PM". The PM is an abbreviation for the particulate matter. For example, regulations on removal of PM emitted from a gasoline engine become strict worldwide, and in a filter to remove the PM, a honeycomb structure is used. As a material of the honeycomb structure, there is especially suitably used a ceramic material such as silicon carbide (SiC), cordierite or aluminum titanate (AT) which is excellent in heat resistance and chemical stability.

Heretofore, as these honeycomb structures, there have been suggested honeycomb structures each including a honeycomb structure body having porous partition walls defining a plurality of cells which extend from an inflow end face to an outflow end face and form through channels for a fluid. Furthermore, as the honeycomb structure, for example, there has also been suggested a honeycomb structure of a segmented structure formed by bonding a plurality of honeycomb segments (e.g., see Patent Documents 1 to 3).

For example, in Patent Document 1, there is disclosed a technology of combining a plurality of honeycomb filters to manufacture one ceramic filter assembly. Ceramic filter assemblies are bonded to one another via a ceramic sealing member layer (hereinafter referred to also as "a bonding layer"). Furthermore, for example, in Patent Document 2, a honeycomb structure is disclosed in which first honeycomb segments are arranged in a central region and second honeycomb segments are arranged in a circumferential region, in a cross section of the honeycomb structure which is perpendicular to an axial direction. The honeycomb structure disclosed in Patent Document 2 is constituted so that a cross-sectional area of the first honeycomb segment is smaller than that of the second honeycomb segment.

In Patent Document 3, there is disclosed a technology of using pseudo-quadrangular segments each of which is constituted of a triangular segment and an auxiliary member as honeycomb segments to be arranged at four corners of a bonded body when the honeycomb segments are bonded to prepare the bonded body. According to this technology, it is considered that a raw material yield of the honeycomb structure can improve and manufacturing cost can decrease. Another conventional technology is, for example, a technology of changing a circumferential shape of the honeycomb structure of the segmented structure to decrease cracks and the like generated due to thermal stress.

[Patent Document 1] WO 01/23069
[Patent Document 2] WO 2004/096414
[Patent Document 3] JP 5097237

SUMMARY OF THE INVENTION

In a honeycomb structure for use as an exhaust gas purifying member, large thermal stress might be generated due to rapid temperature change of an exhaust gas or local heat generation. Furthermore, in this honeycomb structure, the large thermal stress might be generated also in the case of burning and removing trapped soot. Bonded portions in the honeycomb structure of a segmented structure have a relieving function to prevent the large thermal stress from being applied to individual honeycomb segments when the thermal stress is generated in the honeycomb structure. Usually in the honeycomb structure for use as the exhaust gas purifying member, there is the tendency that the thermal stress heightens in the vicinity of a center of a cross section perpendicular to an axial direction. Consequently, when the honeycomb structure has a bonding layer via which three honeycomb segments are bonded in a T-shape as in a honeycomb structure described in Patent Document 1, there is the problem that cracks are easily generated in the honeycomb segment on an extension line of a T-shaped bonded portion.

In a structure where in a central region, there are arranged segments each having a cross-sectional area smaller than that of each of segments arranged in a circumferential region as in a honeycomb structure described in Patent Document 2, it is considered that the thermal stress can be relieved by increasing bonded portions in the central region in which the thermal stress increases. However, in the honeycomb structure described in Patent Document 2, the bonded portions increase in the central region, and hence there is the problem that through channels for the exhaust gas in the central region decrease to increase pressure loss. Especially, when the exhaust gas flows through the honeycomb structure, there is the tendency that the exhaust gas flows in the central region more easily than in the circumferential region, and hence the above-mentioned pressure loss conspicuously increases.

In a honeycomb structure described in Patent Document 3, polygonal honeycomb segments are regularly arranged in a cross section of the honeycomb structure which is perpendicular to an extending direction of cells. Consequently, in the honeycomb structure of a segmented structure, a bonding layer which bonds the respective honeycomb segments has a linear shape to connect one point of a peripheral edge to the other point of the peripheral edge of the honeycomb structure in the cross section of the honeycomb structure. Furthermore, even in the modified honeycomb structure of the segmented structure whose circumferential shape is modified, a bonding layer linearly connecting one point of the peripheral edge of the honeycomb structure to the other point thereof is usually disposed in a latticed manner longitudinally and transversely in the above cross section, to regularly bond the respective honeycomb segments. In the case of using such a honeycomb structure as an exhaust gas purifying filter, the honeycomb structure is occasionally used in a state where the honeycomb structure is stored in a can member of a metal case or the like. When a shearing force is locally applied to the bonding layer during the storage of the honeycomb structure of the segmented structure in the can member or during the use in the state where the honeycomb structure is stored in the can member, there is the problem that shear fracture is likely to occur in the bonding layer. Hereinafter, the storing of the honeycomb structure in the can member of the metal case or the like will occasionally be referred to as canning.

The present invention has been developed in view of the problems of the above-mentioned conventional technologies. An object of the present invention is to provide a honeycomb structure of a segmented structure which has an excellent thermal shock resistance and is capable of effectively inhibiting damages on a bonding layer due to shearing stress.

According to the present invention, there is provided a honeycomb structure as follows.

According to a first aspect of the present invention, a honeycomb structure is provided including:

a plurality of prismatic columnar honeycomb segments each having porous partition walls defining a plurality of cells extending from an inflow end face into which a fluid flows to an outflow end face out of which the fluid flows, and a segment circumferential wall disposed at an outermost circumference; and a bonding layer which bonds side surfaces of the plurality of honeycomb segments to one another, wherein the plurality of honeycomb segments include a plurality of complete segments having the same cross-sectional shape in a cross section perpendicular to an extending direction of the cells, and a plurality of incomplete segments each having a cross-sectional shape of a part of the cross-sectional shape of the complete segment, the bonding layer has a plurality of rows in each of which a plurality of bonding layer portions each disposed between two honeycomb segments arranged to face each other are arranged to extend from one point of a peripheral edge of a bonded body of the honeycomb segments to the other point thereof, in the cross section perpendicular to the extending direction of the cells, the bonding layer of each of the plurality of rows is disposed so that among the plurality of bonding layer portions arranged in one direction, an outermost circumference bonding layer portion disposed at the outermost circumference in the cross section and at least one of the other bonding layer portions arranged in the one direction are not superimposed on each other on an extension line of the one direction, and in each of the plurality of honeycomb segments, a ratio of shift of side surfaces of adjacent honeycomb segments which face each other to a length of one side of a side surface of the complete segment is 10% or less.

According to a second aspect of the present invention, the honeycomb structure according to the above first aspect is provided, wherein a width of the bonding layer portion is from 0.5 to 3.0 mm.

According to a third aspect of the present invention, the honeycomb structure according to the above first or second aspects is provided, further including plugging portions arranged to plug one of open ends of each of the cells formed in the honeycomb segments.

A honeycomb structure of the present invention is the honeycomb structure of a segmented structure in which a plurality of honeycomb segments are bonded by a bonding layer. In the honeycomb structure of the present invention, the bonding layer extending in one direction is constituted of bonding layer portions arranged in the one direction. Furthermore, the bonding layer has a plurality of rows arranged in respective directions. A plurality of bonding layer portions constituting the bonding layer of each row are arranged so that an outermost circumference bonding layer portion and at least one of the other bonding layer portions are not superimposed on each other on an extension line of the one direction. Additionally, in each of the plurality of honeycomb segments, a ratio of shift of side surfaces of adjacent honeycomb segments which face each other to a length of one side of a side surface of a complete segment is 10% or less.

The honeycomb structure of the present invention has an excellent thermal shock resistance and is capable of effectively inhibiting damages on the bonding layer due to shearing stress. Therefore, it is possible to effectively inhibit the damages on the bonding layer, even when a local shearing force is applied to the bonding layer during storage of the honeycomb structure of the present invention in a can member or during use in a state where the honeycomb structure is stored in the can member.

DESCRIPTION OF THE PREFERRED EMBODIMENTS

Hereinafter, description will be made as to embodiments of the present invention, but the present invention is not limited to the following embodiments. Therefore, it should be understood that the following embodiments to which changes, improvements and the like are suitably added on the basis of ordinary knowledge of a person skilled in the art without departing from the gist of the present invention also fall in the scope of the present invention.

(1) Honeycomb Structure:

As shown in FIG. 1 to FIG. 5, a first embodiment of a honeycomb structure of the present invention is a honeycomb structure 100 including a plurality of prismatic columnar honeycomb segments 4 and a bonding layer 6. The honeycomb structure 100 of the present embodiment is a so-called honeycomb structure of a segmented structure. The honeycomb structure 100 further includes, at its circumference, an outer wall 8 disposed to surround a plurality of honeycomb segments 4. The honeycomb structure 100 of the present embodiment is suitably utilizable as a trapping filter to remove particulate matter included in an exhaust gas.

Figure 1:
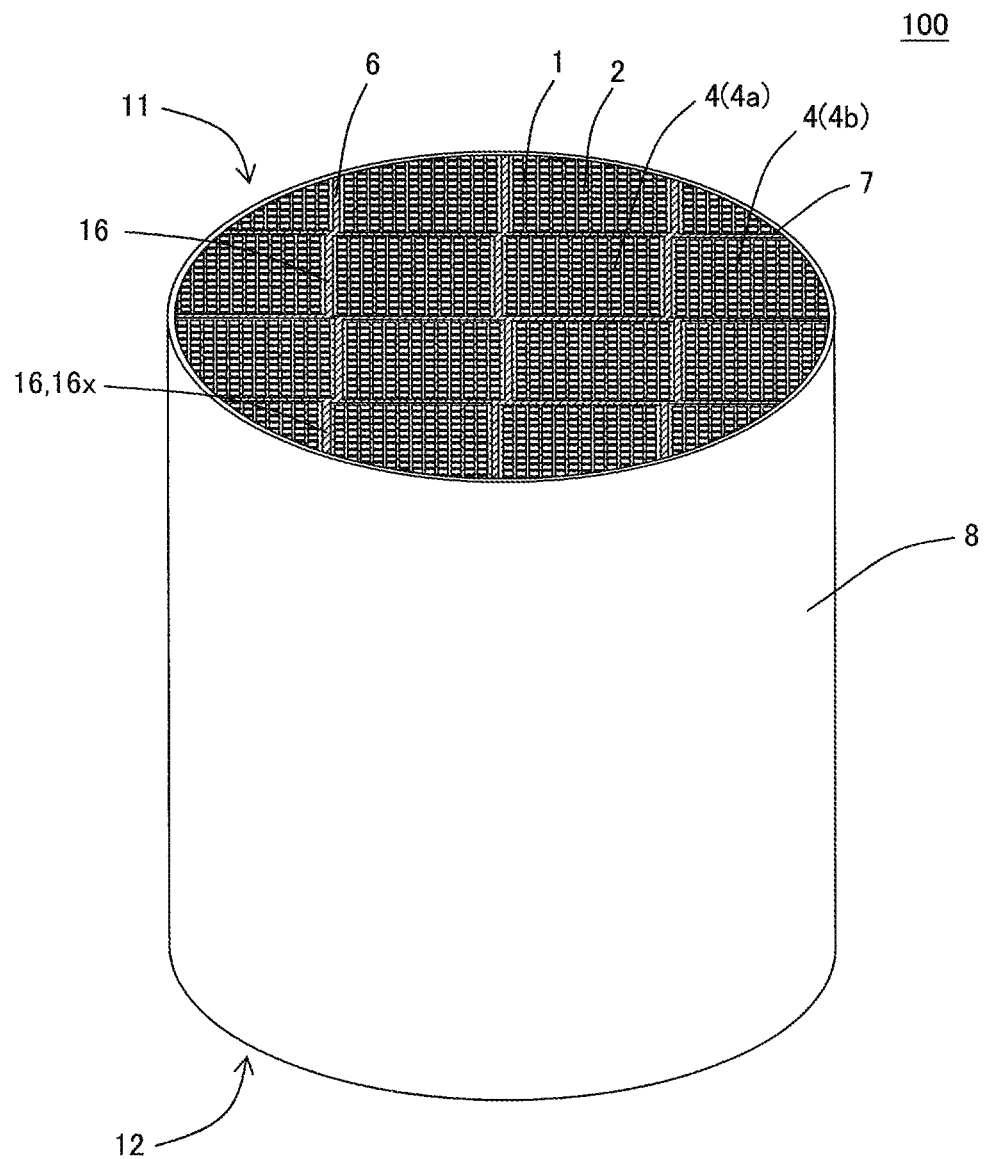
FIG. 1 is a perspective view schematically showing a first embodiment of a honeycomb structure of the present invention and seen from the side of an inflow end face.
Figure 2:
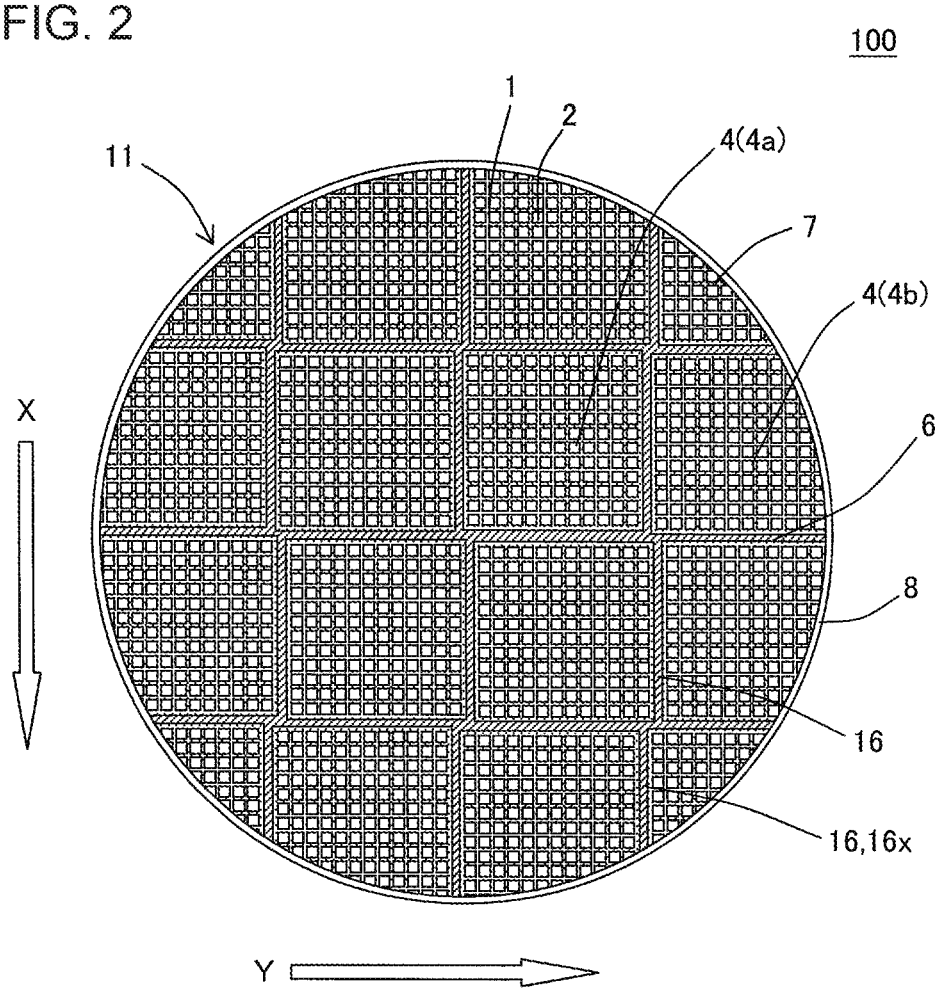
FIG. 2 is a plan view schematically showing the inflow end face of the honeycomb structure shown in FIG. 1.
Figure 3:
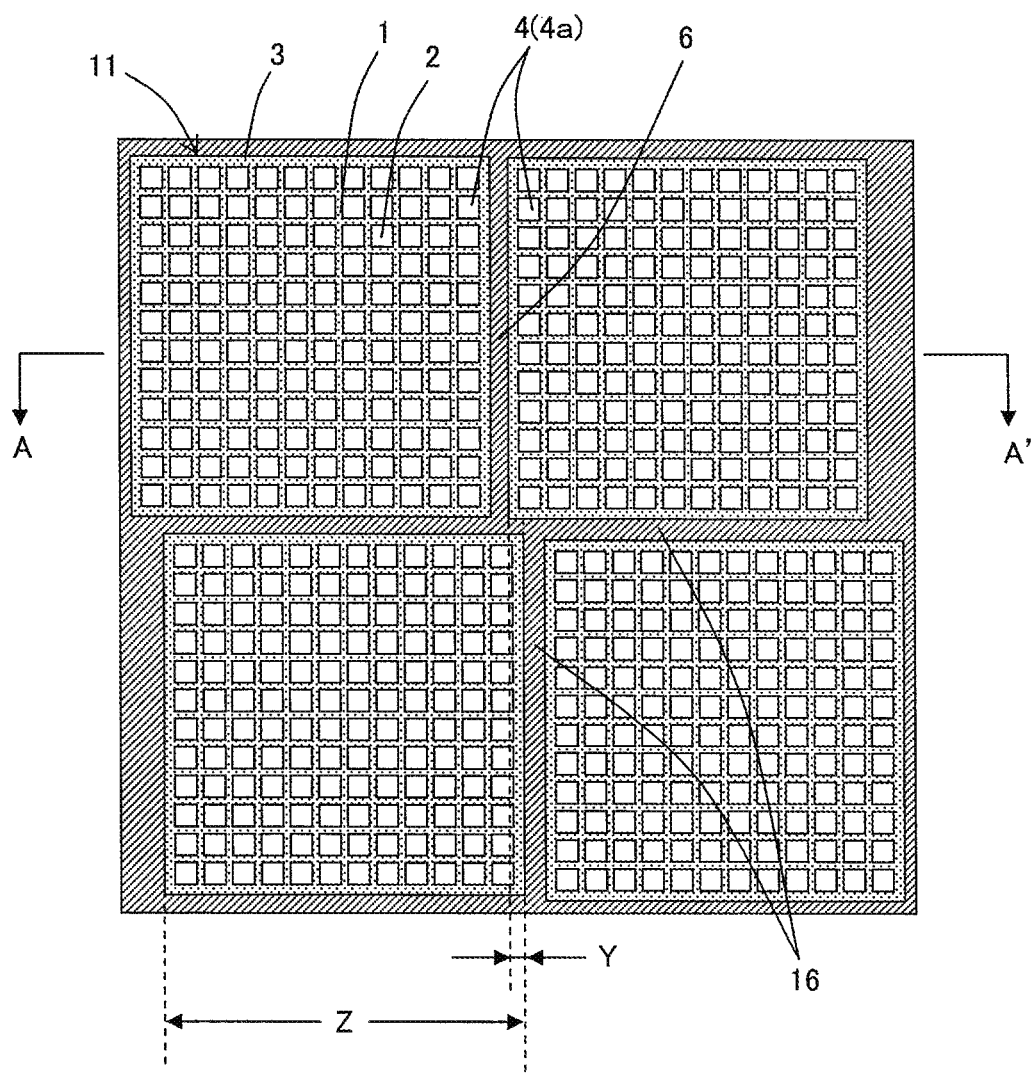
FIG. 3 is an enlarged plan view showing an enlarged part of the inflow end face of the honeycomb structure shown in FIG. 1.
Figure 4:
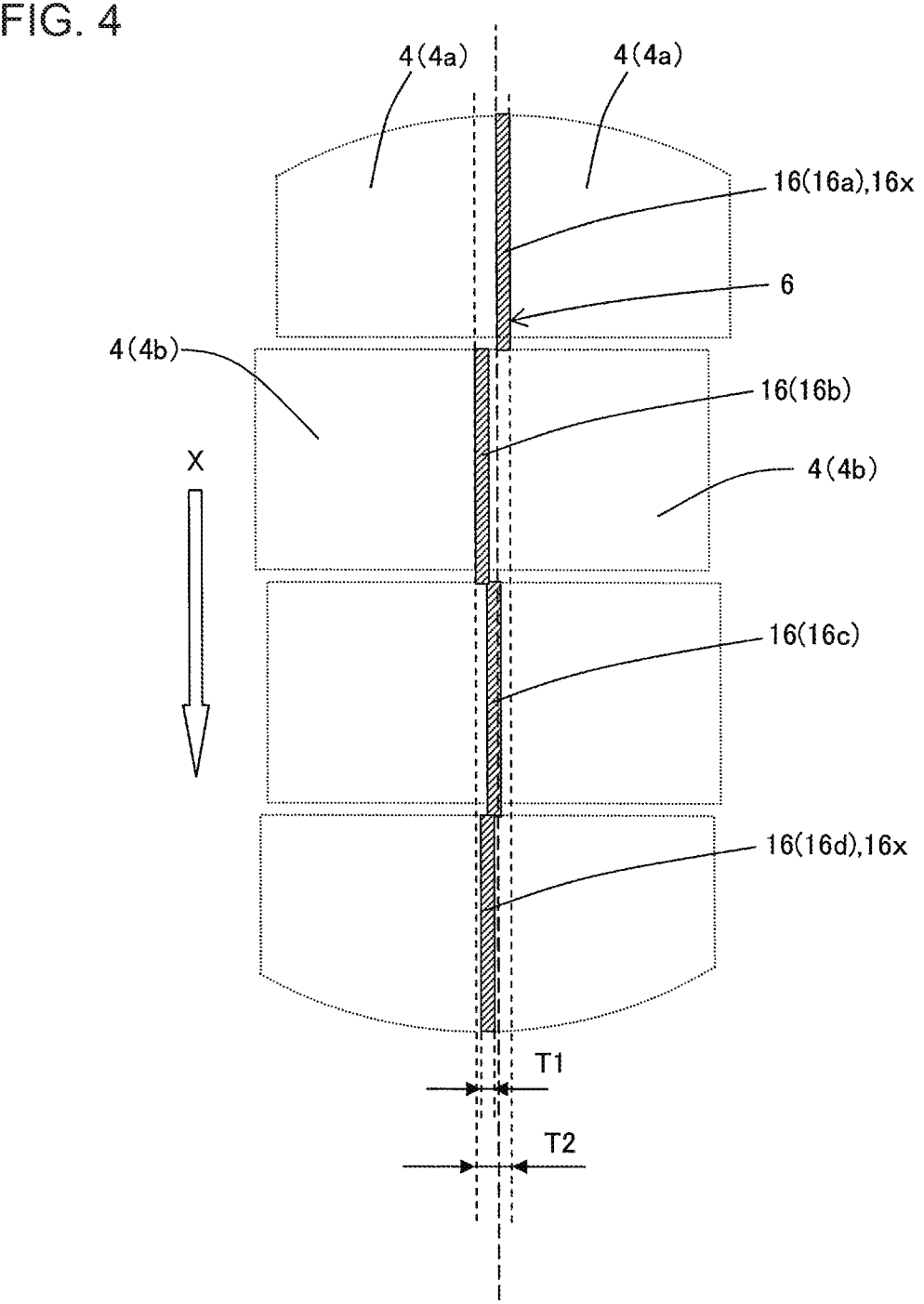
FIG. 4 is a schematic view to explain an arrangement state of a bonding layer in the first embodiment of the honeycomb structure of the present invention.
Figure 5:
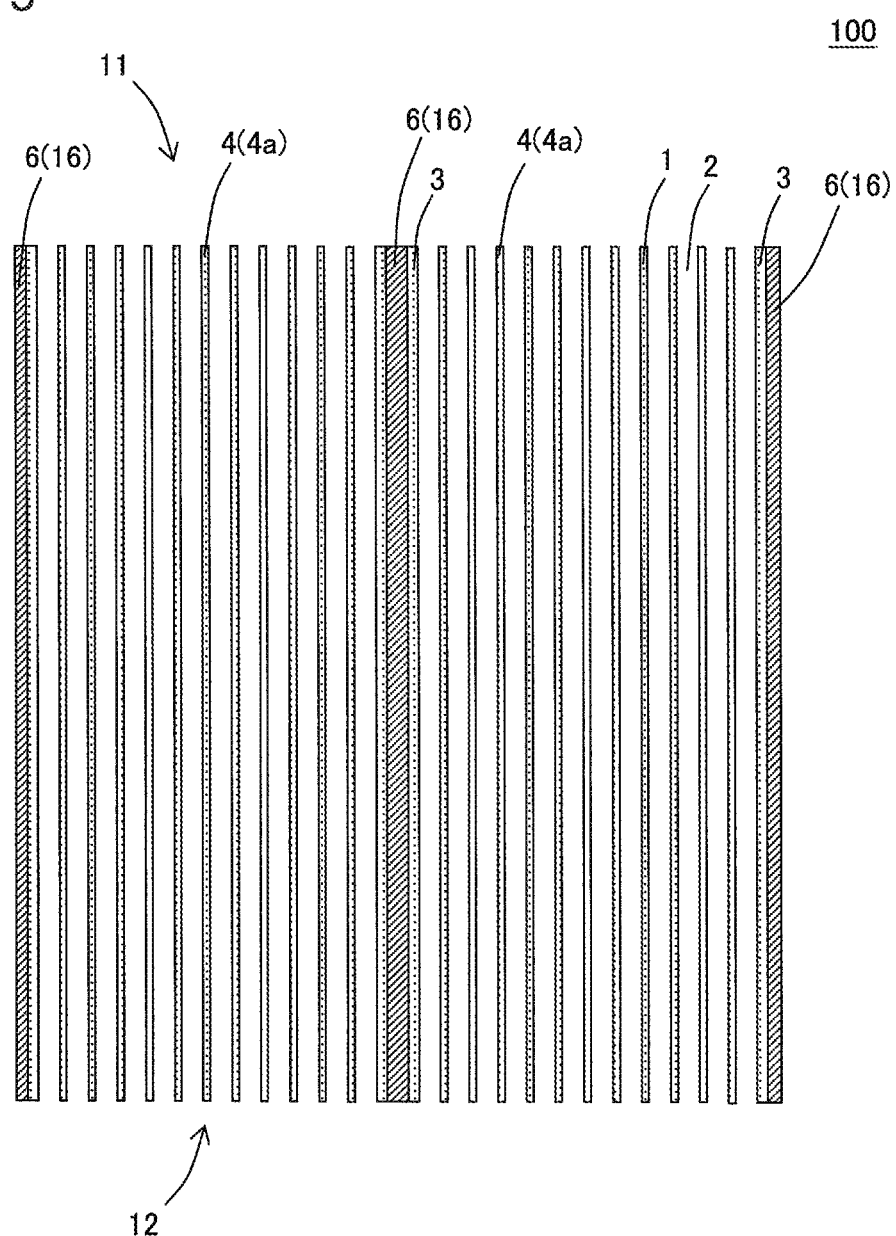
FIG. 5 is a cross-sectional view schematically showing a cross section taken along the A-A' line of FIG. 3.

Here, FIG. 1 is a perspective view schematically showing the first embodiment of the honeycomb structure of the present invention and seen from the side of an inflow end face. FIG. 2 is a plan view schematically showing the inflow end face of the honeycomb structure shown in FIG. 1. FIG. 3 is an enlarged plan view showing an enlarged part of the inflow end face of the honeycomb structure shown in FIG. 1. FIG. 4 is a schematic view to explain an arrangement state of the bonding layer in the first embodiment of the honeycomb structure of the present invention. FIG. 5 is a cross-sectional view schematically showing a cross section taken along the A-A' line of FIG. 3. It is to be noted that in FIG. 4, partition walls and cells formed in the honeycomb segment are drawn in an abstracted manner.

The honeycomb segment 4 has porous partition walls 1 defining a plurality of cells 2 extending from an inflow end face 11 into which a fluid flows to an outflow end face 12 out of which the fluid flows, and a segment circumferential wall 3 disposed at an outermost circumference. As shown in FIG. 1 to FIG. 5, the honeycomb structure 100 includes the plurality of honeycomb segments 4, and side surfaces of the plurality of honeycomb segments 4 are bonded to one another via the bonding layer 6. In the honeycomb structure 100 of the present embodiment, the plurality of honeycomb segments 4 include a plurality of complete segments 4a having the same cross-sectional shape in a cross section perpendicular to an extending direction of the cells 2, and a plurality of incomplete segments 4b each having a cross-sectional shape of a part of the cross-sectional shape of the complete segment 4a. For example, as shown in FIG. 1 and FIG. 2, among the plurality of honeycomb segments 4, the honeycomb segments 4 arranged in a central portion of the honeycomb structure 100 possess "a prismatic columnar shape" in which a direction from the inflow end face 11 toward the outflow end face 12 is an axial direction. The prismatic columnar honeycomb segments 4 arranged in the central portion are the complete segments 4a. On the other hand, among the plurality of honeycomb segments 4, the honeycomb segments 4 arranged in a circumferential portion which is in contact with the outer wall 8 have a pillar shape obtained by grinding, along a shape of the outer wall 8, a part of the honeycomb segment 4 formed in the prismatic columnar shape. The honeycomb segments 4 arranged in this circumferential portion are the incomplete segments 4b.

The bonding layer 6 is made of a bonding material which bonds the side surfaces of the plurality of honeycomb segments 4 to one another. A bonded body obtained by bonding the plurality of honeycomb segments 4 via the bonding layer 6 is occasionally referred to as a honeycomb segment bonded body 7.

The bonding layer 6 has a plurality of rows in each of which a plurality of bonding layer portions 16 are arranged to extend from one point of a peripheral edge of the honeycomb segment bonded body 7 to the other point thereof, in a cross section of the honeycomb segment bonded body 7 which is perpendicular to the extending direction of the cells 2. The bonding layer portion 16 is an element constituting a part of the bonding layer 6 disposed between two honeycomb segments 4 and 4 arranged to face each other. Therefore, it can be considered that the bonding layer 6 is an assembly of the bonding layer portions 16. The respective bonding layer portions 16 are continuous with one another via an intersection of two intersecting rows of the bonding layer 6, and in the honeycomb segment bonded body 7, the bonding layer 6 is present as one structure. For example, the bonding layer 6 shown in FIG. 2 has a plurality of rows constituted of longitudinal rows and transverse rows which are arranged in a latticed manner.

In the honeycomb structure 100 of the present embodiment, the bonding layer 6 of each row is constituted as follows. Here, among the plurality of bonding layer portions 16 arranged in one direction, the bonding layer portion 16 disposed at the outermost circumference in the cross section perpendicular to the extending direction of the cells 2 is defined as an outermost circumference bonding layer portion 16x. The honeycomb structure is characterized in that the bonding layer 6 of each row is disposed so that the outermost circumference bonding layer portion 16x ("a bonding layer portion 16a" in FIG. 4) and at least one of the other bonding layer portions 16b, 16c and 16d are not superimposed on each other on an extension line of the one direction. For example, in the example shown in FIG. 4, the bonding layer 6 is disposed so that the bonding layer portion 16a disposed at the top of a paper space (i.e., the outermost circumference bonding layer portion 16x) and the other bonding layer portion 16b disposed at the second from the top of the paper space are not superimposed on each other on an extension line of one direction X. In this way, "the row in which the plurality of bonding layer portions 16 are arranged" in the present invention conceptually includes a row having a state where at least one outermost circumference bonding layer portion 16x shifts as described above.

The honeycomb structure 100 of the present embodiment is capable of effectively inhibiting damages on the bonding layer 6 due to shearing stress. Therefore, for example, it is possible to effectively inhibit the damages on the bonding layer 6, even when a local shearing force is applied to the bonding layer 6 during storage of the honeycomb structure 100 in a can member or during use in a state where the structure is stored in the can member.

In the plurality of honeycomb segments 4, a ratio of shift of the side surfaces of the adjacent honeycomb segments 4 and 4 which face each other to a length of one side of the side surface of the complete segment 4a is 10% or less. According to this constitution, the honeycomb structure 100 of the present embodiment has an excellent thermal shock resistance. "The shift of the side surfaces of the adjacent honeycomb segments 4 and 4 which face each other" means a length in a range denoted with character Y in FIG. 3. That is, "the shift Y" means a length of an intruding portion of the other honeycomb segment 4 to the adjacent honeycomb segments 4 and 4. Therefore, in "the row constituted of the bonding layer portions 16 arranged in one direction", at least one of the bonding layer portions 16 constituting each row may project from the row in a range in which "a shift ratio" of the adjacent honeycomb segments 4 and 4 is 10% or less. Hereinafter, description will be made as to "the shift ratio".

Hereinafter, a percentage (Y/Z×100%) of the ratio of the shift Y of the side surfaces of the adjacent honeycomb segments 4 and 4 which face each other to a length Z of one side of the side surface of the complete segment 4a will occasionally be referred to as "the shift ratio" of the adjacent honeycomb segments 4 and 4. In the honeycomb structure 100 of the present embodiment, "the shift ratio" of the adjacent honeycomb segments 4 and 4 is 10% or less. When "the shift ratio" of the adjacent honeycomb segments 4 and 4 is in excess of 10%, cracks might easily be generated in each honeycomb segment 4 on an extension line of the bonding layer portions 16.

In the present description, when the bonding layer portions "are not superimposed on each other on the extension line of the one direction X", the following state is meant. Initially, in FIG. 4, an upward-downward direction of the paper space is defined as the direction X. In FIG. 4, each of four bonding layer portions 16 is disposed between the two honeycomb segments 4 and 4. Furthermore, each of the four bonding layer portions 16 is substantially disposed in parallel with the direction X. For example, when the bonding layer portion 16a is moved along the direction X, the bonding layer portion is not superimposed on at least one of the other bonding layer portions 16b, 16c and 16d. In this case, it is considered that the bonding layer portions "are not superimposed on each other on the extension line of the one direction X". The honeycomb structure 100 of the present embodiment has a state where at least one of the outermost circumference bonding layer portions 16x at both ends in the one direction and the other bonding layer portion 16 (including the other outermost circumference bonding layer portion 16x) are not superimposed on each other on the extension line of the direction X. For example, in FIG. 4, the bonding layer portion 16b and the bonding layer portion 16c, or the bonding layer portion 16c and the bonding layer portion 16d are superimposed on each other on the extension line of the direction X.

Figure 6:
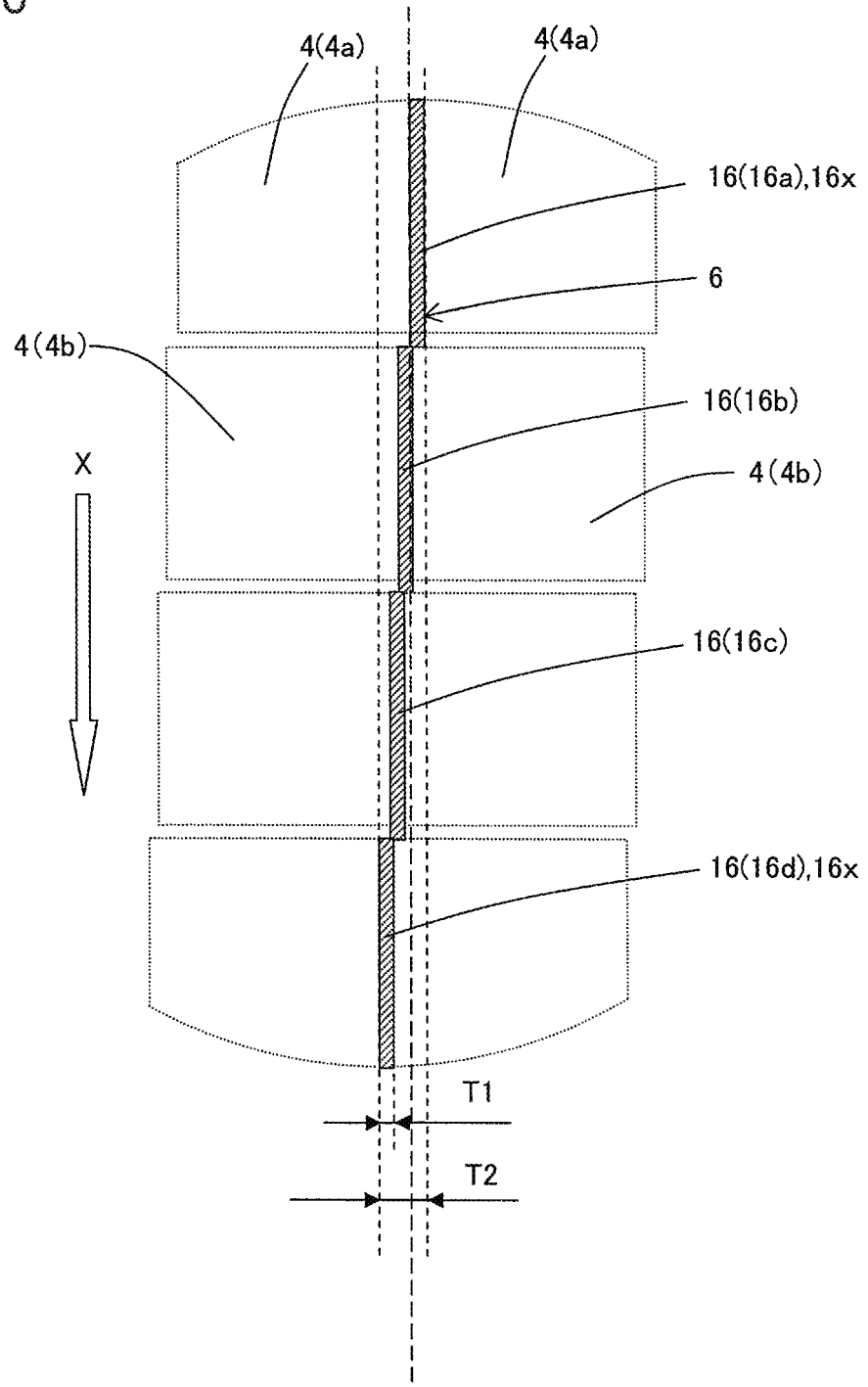
FIG. 6 is a schematic view to explain another example of the arrangement state of the bonding layer.
Figure 7:
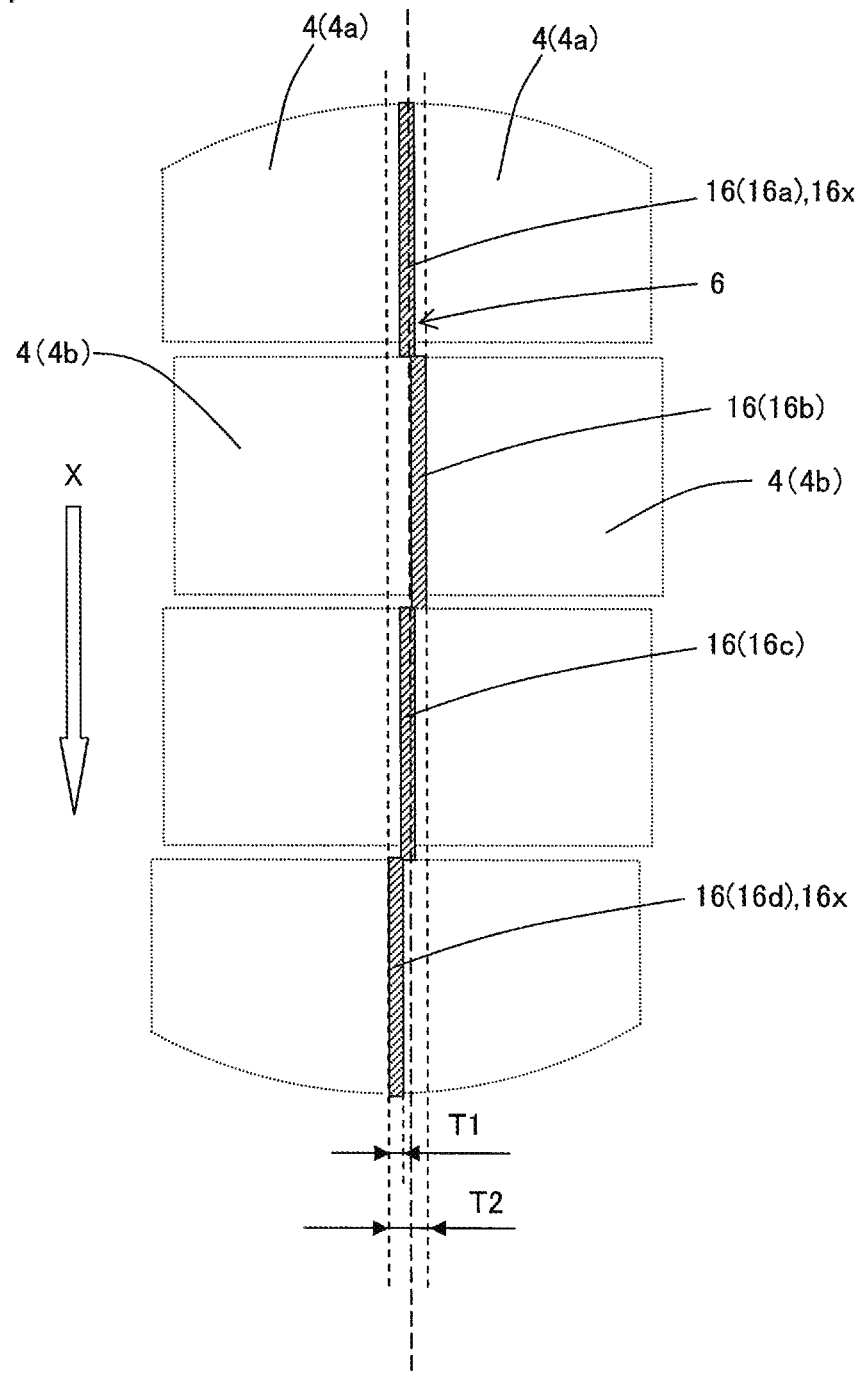
FIG. 7 is a schematic view to explain still another example of the arrangement state of the bonding layer.
Figure 8:
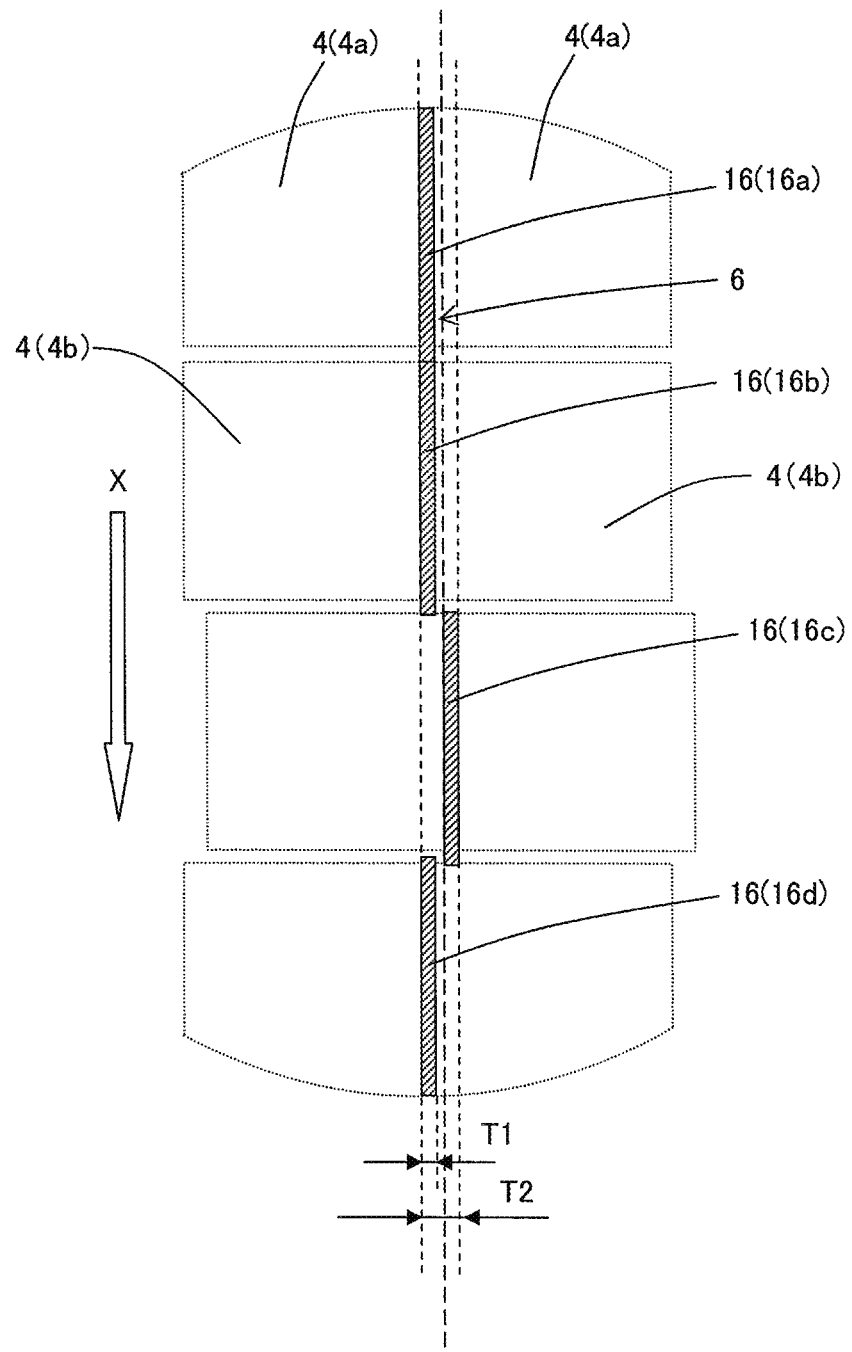
FIG. 8 is a schematic view to explain a further example of the arrangement state of the bonding layer.

Furthermore, in FIG. 4, the four bonding layer portions 16a, 16b, 16c and 16d are arranged in a state of alternately shifting in a right-left direction toward the downside of the paper space, on the extension line of the direction X. The arrangement of the respective bonding layer portions 16a, 16b, 16c and 16d, i.e., each shifting direction is not limited to the example of FIG. 4. Examples of the arrangement state of the bonding layer include such arrangement states as shown in FIG. 6 to FIG. 8. Here, FIG. 6 to FIG. 8 are schematic views to explain the other examples of the arrangement state of the bonding layer.

In FIG. 6, four bonding layer portions 16a, 16b, 16c and 16d are all arranged in a state of shifting in a left direction toward the downside of a paper space. Two bonding layer portions 16 and 16 adjacent in an upward-downward direction of the paper space are arranged to be superimposed on each other on an extension line of a direction X. However, when attention is paid to the bonding layer portion 16a that is one outermost circumference bonding layer portion 16x and the bonding layer portion 16d that is the other outermost circumference bonding layer portion 16x, it is found that the two bonding layer portions 16a and 16d are not superimposed on each other.

In FIG. 7, a bonding layer portion 16b disposed at the second from the top of a paper space and a bonding layer portion 16d disposed at the bottom of the paper space (i.e., an outermost circumference bonding layer portion 16x) are not superimposed on each other on an extension line of a direction X.

In FIG. 8, three bonding layer portions 16a, 16b and 16d are arranged to be completely matched on an extension line of a direction X, and a bonding layer portion 16c is only disposed in a state of shifting in a right direction of a paper space. Then, the bonding layer portion 16c is not superimposed on three bonding layer portions 16 of the bonding layer portions 16a, 16b and 16d on the extension line of the direction X. Consequently, in the example shown in FIG. 8, the bonding layer portion 16c is not superimposed on an outermost circumference bonding layer portion 16x disposed at the top of the paper space and an outermost circumference bonding layer portion 16x disposed at the bottom of the paper space on the extension line of the direction X. In this way, when at least a pair of bonding layer portions 16 are not superimposed on each other on the extension line of the direction X, the other bonding layer portions 16 may be arranged to be matched on the extension line of the direction X.

In the honeycomb structure 100 of the present embodiment shown in FIG. 1 to FIG. 5, there are not any special restrictions on a width T1 of the bonding layer portion 16. For example, the width T1 of each of the bonding layer portions 16 is preferably from 0.5 to 3.0 mm, further preferably from 0.5 to 2.5 mm, and especially preferably from 0.5 to 1.5 mm. The width T1 of the bonding layer portion 16 means the width of the bonding layer portion 16 in a direction perpendicular to "the direction X in which the plurality of bonding layer portions 16 are arranged". When the width T1 of the bonding layer portion 16 is smaller than 0.5 mm, the honeycomb structure is not preferable in the thermal shock resistance, and when the width T1 of the bonding layer portion 16 is in excess of 3.0 mm, the honeycomb structure is not preferable in a shearing strength.

As shown in FIG. 4, each of the bonding layer portions 16a, 16b, 16c and 16d is substantially disposed in parallel with the direction X. Here, the "substantially parallel" bonding layer portion is present in a range of ±15° to the direction X. Consequently, each of the bonding layer portions 16a, 16b, 16c and 16d may be disposed in a slightly tilted state in the range of ±15° to the direction X. Furthermore, "the direction X" is defined, in the bonding layer 6 constituting the honeycomb segment bonded body 7 shown in FIG. 2, as an extending direction of a straight line drawn to connect one point of a peripheral edge of the honeycomb segment bonded body 7 to the other point of the peripheral edge of the honeycomb segment bonded body 7 on the bonding layer 6. In FIG. 2, the bonding layer 6 extending in an upward-downward direction of a paper space (X-direction) and the bonding layer 6 extending in a right-left direction of the paper space (Y-direction) are arranged almost in a latticed manner.

A value of a width T2 of the bonding layer 6 is determined in accordance with "widths of two bonding layer portions 16 which are not superimposed on each other" and "the shift of the side surfaces of the adjacent honeycomb segments 4 and 4 which face each other". That is, a total value of the respective widths of two bonding layer portions 16 which are most away from each other and the shift of the side surfaces of the adjacent honeycomb segments 4 and 4 which face each other is "the width T2 of the bonding layer 6".

In the honeycomb structure of the present embodiment, the bonding layer is disposed so that the outermost circumference bonding layer portion and at least one of the other bonding layer portions are not superimposed on each other on the extension line of each row, in all the rows parallel to one direction among the plurality of rows constituting the bonding layer. For example, in FIG. 2, in all the rows of the bonding layer 6 which extend in the upward-downward direction (X-direction) of the paper space, the bonding layer is disposed so that one bonding layer portion 16 and the other bonding layer portion 16 are not superimposed on each other on the extension line of each row. According to this constitution, it is possible to especially effectively inhibit the damages on the bonding layer 6 due to the shearing stress.

In the honeycomb structure of the present embodiment, it is preferable that all the rows of the bonding layer are arranged so that the outermost circumference bonding layer portion and at least one of the other bonding layer portions are not superimposed on each other on the extension line of each row. All the rows of the bonding layer are the rows of the bonding layer 6 which extend in the upward-downward direction (X-direction) and right-left direction (Y-direction) of the paper space in FIG. 2. According to this constitution, it is possible to extremely effectively inhibit the damages on the bonding layer 6 due to the shearing stress.

There are not any special restrictions on an overall shape of the honeycomb structure. For example, the overall shape of the honeycomb structure 100 shown in FIG. 1 is a round pillar shape in which the inflow end face 11 and the outflow end face 12 are round. Additionally, although not shown in the drawing, the overall shape of the honeycomb structure may be a pillar shape in which the inflow end face and the outflow end face have a substantially round shape such as an elliptic shape, a racetrack shape or an oval shape. Furthermore, the overall shape of the honeycomb structure may be a prismatic columnar shape in which the inflow end face and the outflow end face have a polygonal shape such as a quadrangular shape or a hexagonal shape.

There are not any special restrictions on a shape of the honeycomb segment. An example of the shape of the honeycomb segment is a prismatic columnar shape in which a cross-sectional shape perpendicular to the axial direction of the honeycomb segment is quadrangular. It is to be noted that the honeycomb segment disposed at the outermost circumference of the honeycomb structure may be processed, for example, by grinding a part of the prismatic columnar shape in accordance with the overall shape of the honeycomb structure.

A thickness of the partition walls of each honeycomb segment is preferably from 50 to 600 μm, further preferably from 100 to 500 μm, and especially preferably from 150 to 450 μm. When the thickness of the partition walls is smaller than 50 μm, an isostatic strength of the honeycomb structure might deteriorate. When the thickness of the partition walls is in excess of 600 μm, pressure loss increases, thereby occasionally causing output drop of an engine or deterioration of fuel efficiency. The thickness of the partition walls is a value measured by a method of observing the cross section of the honeycomb structure which is perpendicular to the axial direction with an optical microscope.

In each honeycomb segment, a cell density of the cells defined by the partition walls is preferably from 5 to 100 cells/cm$^2$ and further preferably from 10 to 90 cells/cm$^2$. According to this constitution, the honeycomb structure of the present embodiment is suitably utilizable as an exhaust gas purifying catalyst carrier, the filter or the like.

A porosity of the partition walls is, for example, preferably from 20 to 90%, further preferably from 25 to 80%, and especially preferably from 30 to 75%. When the porosity of the partition walls is smaller than 20%, the pressure loss increases, thereby occasionally causing the output drop of the engine or the deterioration of the fuel efficiency. Furthermore, when the porosity is in excess of 90%, the isostatic strength of the honeycomb structure might deteriorate. The porosity of the partition walls is a value measured with a mercury porosimeter. An example of the mercury porosimeter is AutoPore 9500 (tradename) manufactured by Micromeritics Instrument Corp.

There are not any special restrictions on a shape of the cells formed in each honeycomb segment. Examples of the shape of the cells in the cross section perpendicular to the extending direction of the cells include a polygonal shape, a round shape, and an elliptic shape. Examples of the polygonal shape include a triangular shape, a quadrangular shape, a pentagonal shape, a hexagonal shape and an octagonal shape. Furthermore, as to the shape of the cells, all the cells may have the same shape or the cells may have different shapes. For example, the cell shape may be a combination of quadrangular cells and octagonal cells. Additionally, as to a size of the cells, all the cells may have the same size or the cells may have different sizes. For example, a cell size of parts of the plurality of cells may be large, and the other cells may have a relatively small size.

There are not any special restrictions on a material constituting the honeycomb segment, but it is preferable from the viewpoint of strength, heat resistance, durability or the like that a main component is any type of ceramics of an oxide or a non-oxide, a metal or the like. Specifically, it is considered that examples of the ceramics include cordierite, mullite, alumina, spinel, silicon carbide, silicon nitride, and aluminum titanate. It is considered that examples of the metal include a Fe—Cr—Al based metal, and metal silicon. It is preferable that the main component is at least one selected from the group consisting of these materials. It is especially preferable from the viewpoint of high strength, high heat resistance or the like that the main component is at least one selected from the group consisting of alumina, mullite, aluminum titanate, cordierite, silicon carbide and silicon nitride. Furthermore, from the viewpoint of high thermal conductivity, high heat resistance or the like, silicon carbide or a silicon-silicon carbide composite material is especially suitable. Here, "the main component" means a component to be contained at a ratio of 50 mass % or more in the material constituting the honeycomb segment. It is to be noted that this main component is contained preferably at a ratio of 70 mass % or more and further preferably at a ratio of 80% or more in the material constituting the honeycomb segment.

Next, description will be made as to a second embodiment of the honeycomb structure of the present invention with reference to FIG. 9 to FIG. 12. As shown in FIG. 9 to FIG. 12, a honeycomb structure 200 of the present embodiment is the honeycomb structure 200 including a plurality of prismatic columnar honeycomb segments 4, and a bonding layer 6. Furthermore, the honeycomb structure 200 further includes plugging portions 5 arranged to plug one of open ends of each of cells 2 formed in the honeycomb segment 4. That is, the honeycomb structure 200 is a honeycomb filter in which each of the plugging portions 5 is disposed in one of ends of each of a plurality of cells 2 on the side of an inflow end face 11 or an outflow end face 12. In the honeycomb structure 200 of the present embodiment, it is preferable that the honeycomb segments 4 and the bonding layer 6 have a constitution similar to that of the honeycomb structure of the first embodiment described above.

Figure 9:
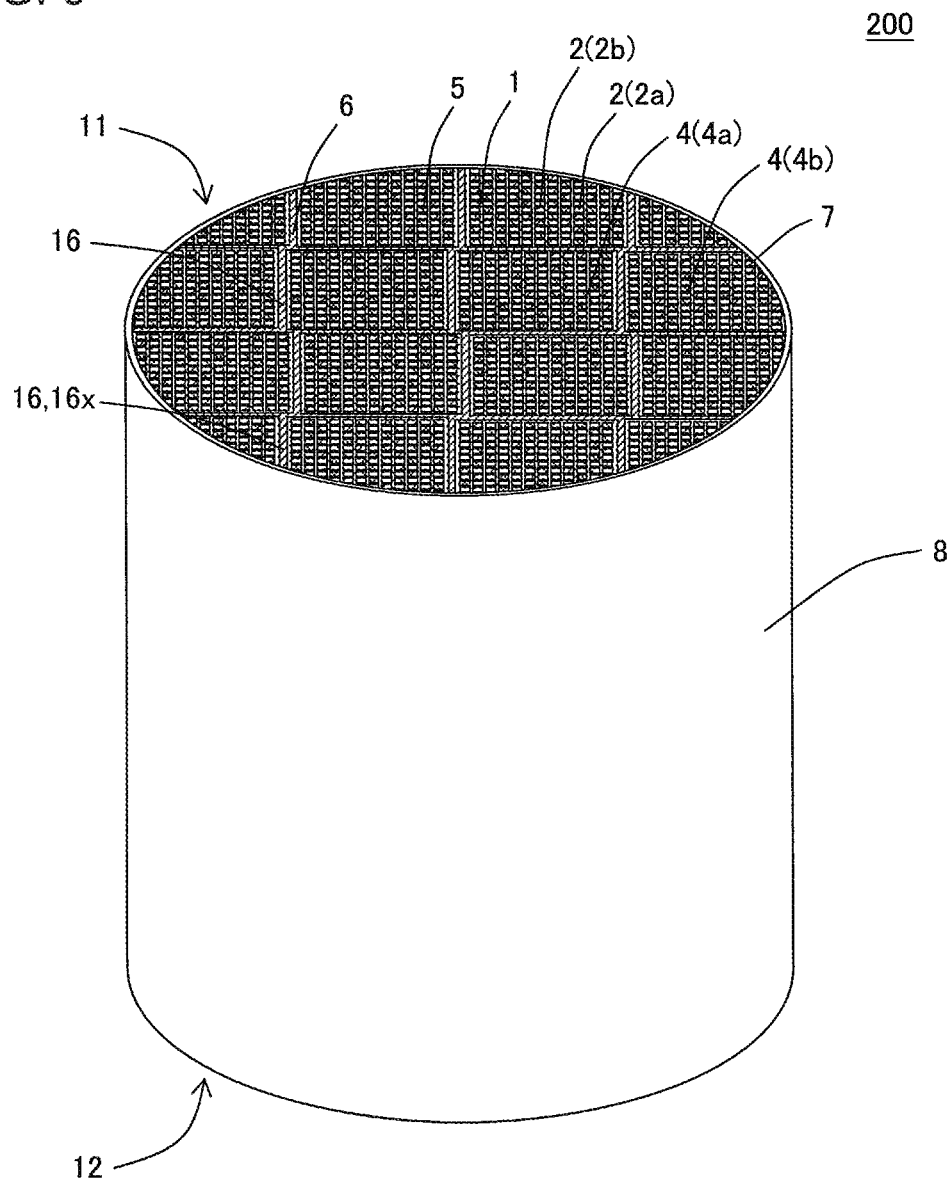
FIG. 9 is a perspective view schematically showing a second embodiment of the honeycomb structure of the present invention and seen from the side of an inflow end face.
Figure 10:
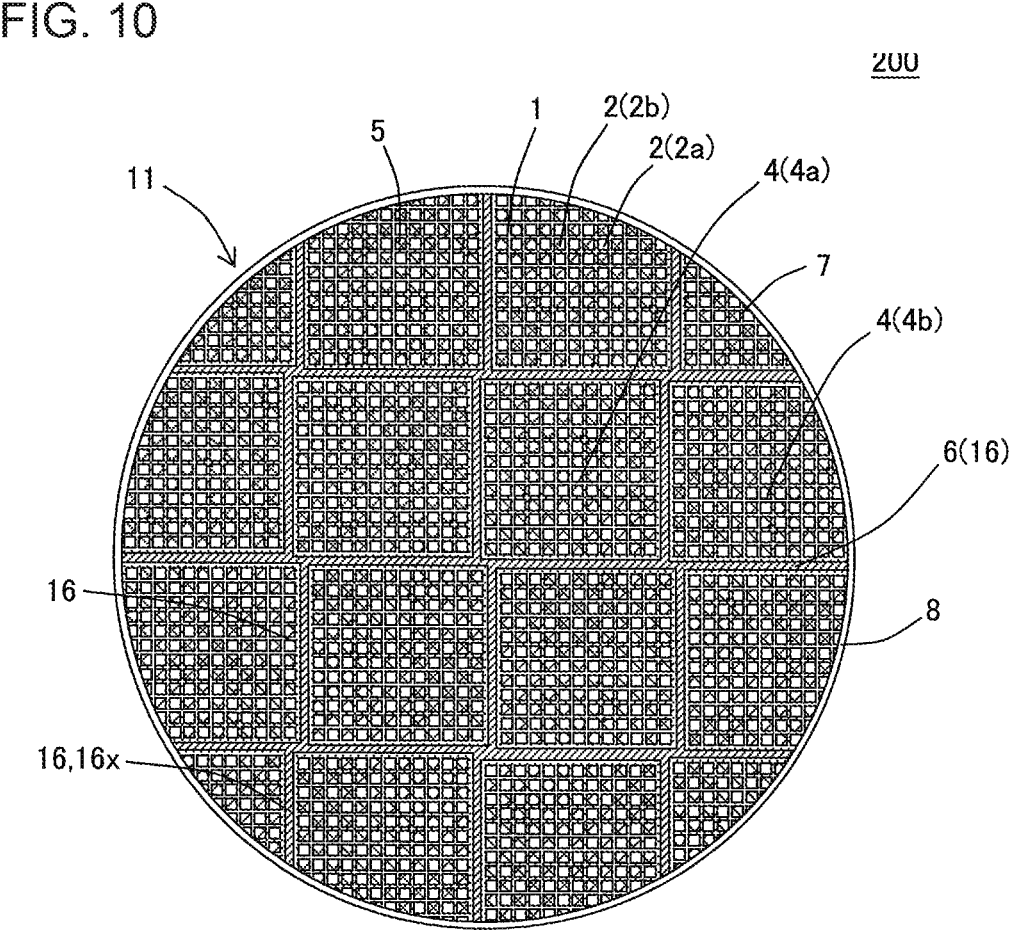
FIG. 10 is a plan view schematically showing the inflow end face of the honeycomb structure shown in FIG. 9.
Figure 11:
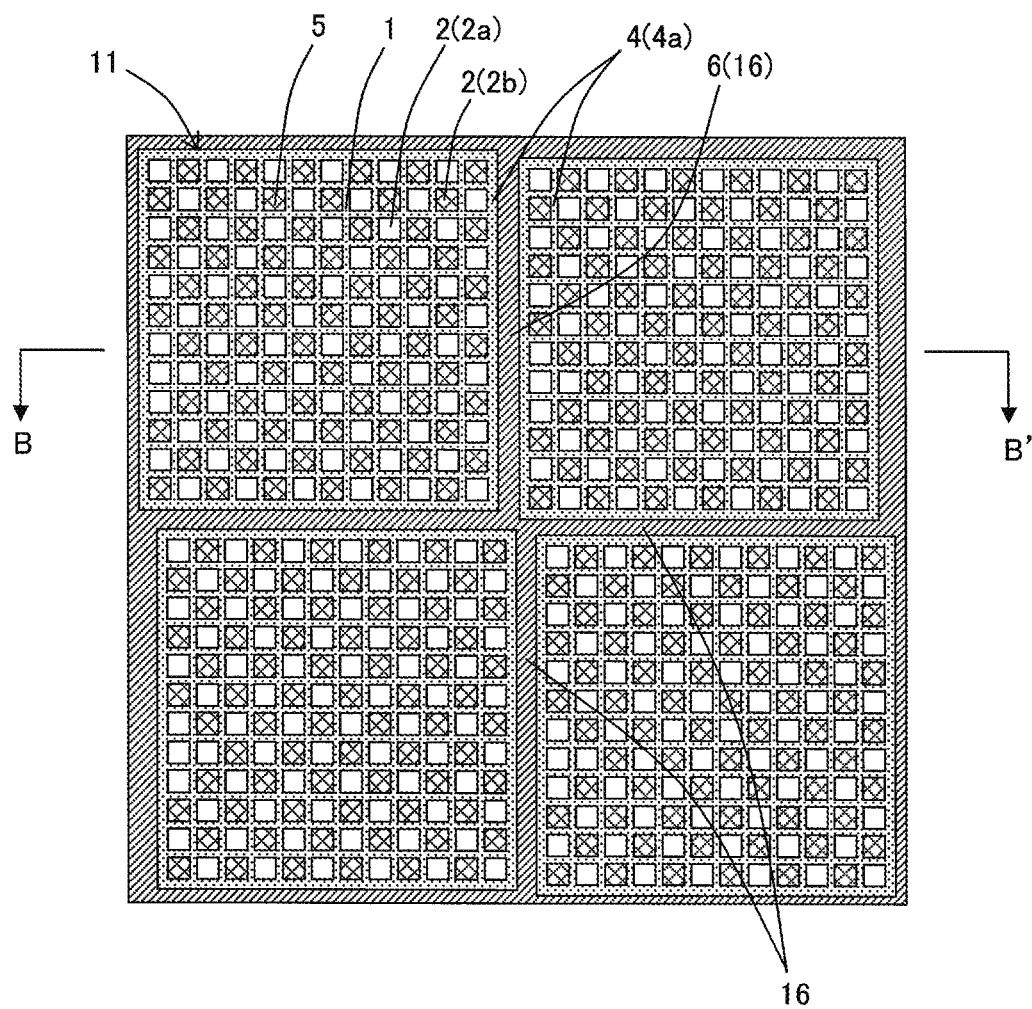
FIG. 11 is an enlarged plan view showing an enlarged part of the inflow end face of the honeycomb structure shown in FIG. 9.
Figure 12:
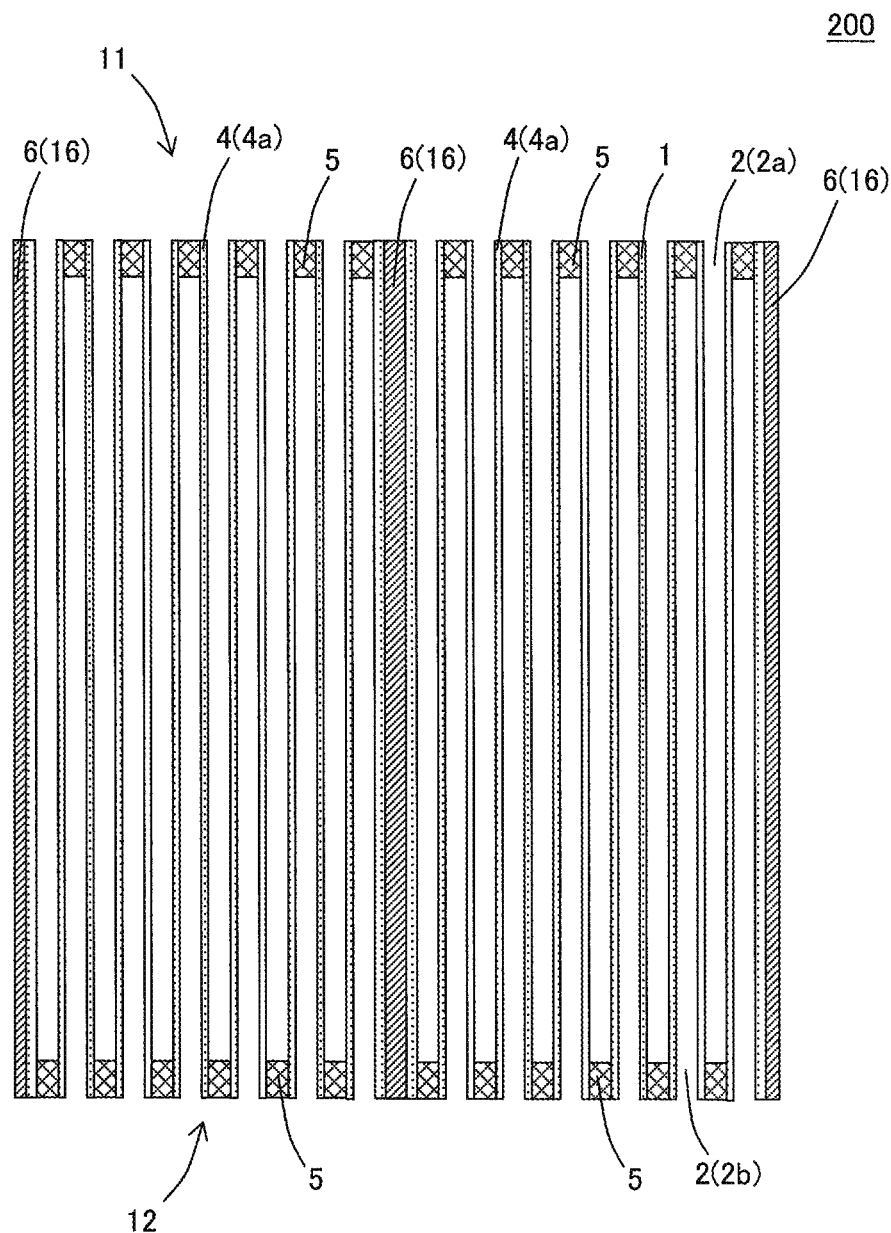
FIG. 12 is a cross-sectional view schematically showing a cross section taken along the B-B' line of FIG. 11.

Here, FIG. 9 is a perspective view schematically showing the second embodiment of the honeycomb structure of the present invention and seen from the side of the inflow end face. FIG. 10 is a plan view schematically showing the inflow end face of the honeycomb structure shown in FIG. 9. FIG. 11 is an enlarged plan view showing an enlarged part of the inflow end face of the honeycomb structure shown in FIG. 9. FIG. 12 is a cross-sectional view schematically showing a cross section taken along the B-B' line of FIG. 11. In FIG. 9 to FIG. 12, constituent elements similar to those of the honeycomb structure 100 shown in FIG. 1 to FIG. 5 are denoted with the same reference numerals and the description thereof is occasionally omitted.

As shown in FIG. 9 to FIG. 12, the plugging portions 5 are arranged to plug one of the open ends of each of the cells 2 formed in each of the honeycomb segments 4 on the side of the inflow end face 11 or the outflow end face 12. For example, the plugging portions 5 are arranged in the open ends of the predetermined cells 2 in the inflow end face 11 of each of the honeycomb segments 4 and the open ends of the residual cells 2 other than the predetermined cells 2 in the outflow end face 12. Hereinafter, among the plurality of cells 2, the cells 2 having the plugging portions 5 arranged in the open ends on the outflow end face 12 side and opened on the inflow end face 11 side are defined as inflow cells 2a. Furthermore, among the plurality of cells 2, the cells having the plugging portions 5 arranged in the open ends on the inflow end face 11 side and opened on the outflow end face 12 side are defined as outflow cells 2b. The honeycomb structure 200 of the present embodiment is suitably usable as an exhaust gas purifying filter, especially a filter to purify an exhaust gas emitted from an engine of a car.

In the honeycomb structure of the present embodiment, a shape of the inflow cells may be the same as a shape of the outflow cells, or the shape of the inflow cells may be different from the shape of the outflow cells. For example, the shape of the inflow cells may be octagonal and the shape of the outflow cells may be quadrangular. Furthermore, as to a size of the cells, all the cells may have the same size or the cells may have different sizes. For example, among the plurality of cells, the size of the inflow cells may be large and the size of the outflow cells may relatively be smaller than the size of the inflow cells. Conversely, among the plurality of cells, the size of the inflow cells may be small and the size of the outflow cells may relatively be larger than the size of the inflow cells. Additionally, the cells having different sizes may be mixed in the inflow cells. The cells having different sizes may also be mixed in the outflow cells.

There are not any special restrictions on an arrangement of the inflow cells and the outflow cells in the honeycomb structure, but it is preferable that at least one of the outflow cells is connected to one inflow cell via a partition wall. For example, when the cell shape is quadrangular, a constitution is preferable in which the inflow cells and the outflow cells are alternately arranged via the partition walls so that both end faces of the honeycomb structure possess complementary checkerboard patterns.

(2) Manufacturing Method of Honeycomb Structure:

Next, description will be made as to a method of manufacturing the honeycomb structure of the present invention. It is to be noted that the method of manufacturing the honeycomb structure of the present invention is not limited to a manufacturing method described below.

Initially, in the case of manufacturing the honeycomb structure of the present invention, a plastic kneaded material to prepare the honeycomb segment is prepared. The kneaded material to prepare the honeycomb segment can be prepared by suitably adding an additive such as a binder, and water to a material selected as raw material powder from the above-mentioned suitable materials of the honeycomb segment.

Next, the kneaded material obtained in this manner is extruded, thereby preparing a prismatic columnar honeycomb formed body having partition walls defining a plurality of cells, and a segment circumferential wall disposed at its outermost circumference. A plurality of honeycomb formed bodies are prepared.

The obtained honeycomb formed bodies are dried, for example, with microwaves and hot air. Next, open ends of the cells are plugged with a material similar to the material used in the preparation of the honeycomb formed bodies, to prepare plugging portions. The honeycomb formed bodies may further be dried after the plugging portions are prepared.

Then, the honeycomb formed bodies in which the plugging portions are prepared are fired, thereby obtaining the honeycomb segments having porous partition walls. A firing temperature and a firing atmosphere vary with a raw material, and a person skilled in the art can select the firing temperature and the firing atmosphere which are most suitable for the selected material.

Figure 13:
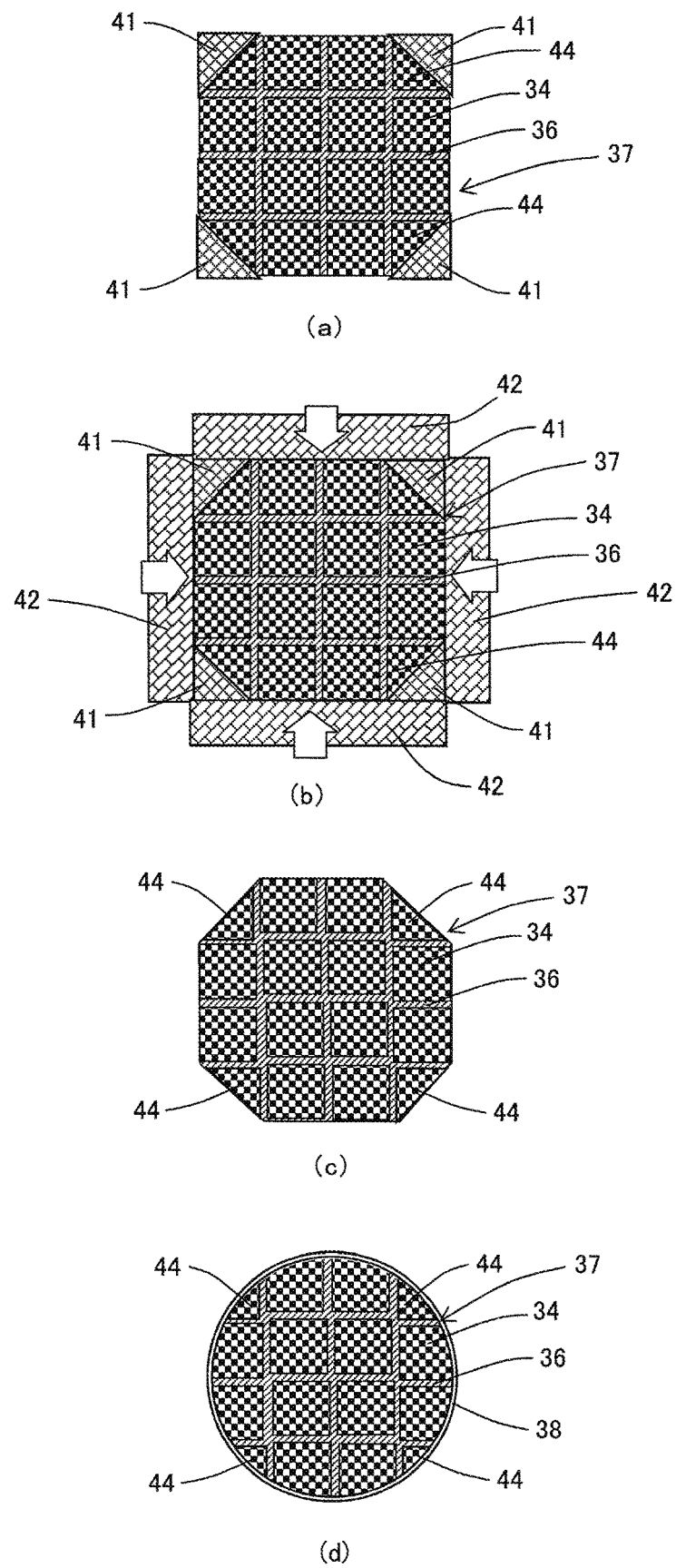
FIG. 13 is an explanatory view to explain a method of bonding honeycomb segments to prepare the honeycomb structure.

Next, a plurality of obtained honeycomb segments are bonded to one another by use of a bonding material and are dried to harden, and then a circumference is processed into a desirable shape, thereby obtaining a honeycomb structure of a segmented structure. An example of a method of bonding the plurality of honeycomb segments is a method shown in FIGS. 13(a) to (d). FIG. 13 is an explanatory view to explain the method of bonding the honeycomb segments to prepare the honeycomb structure. In FIG. 13, the honeycomb segments are bonded to prepare the honeycomb structure in order of (a) to (d).

Initially, as shown in FIG. 13(a), there are prepared a required number of honeycomb segments 34 in which a shape of an end face is quadrangular and a required number of honeycomb segments 44 in which a shape of an end face is triangular. Hereinafter, the honeycomb segments 34 in which the shape of the end face is quadrangular will occasionally be referred to as the quadrangular segments 34. Furthermore, the honeycomb segments 44 in which the shape of the end face is triangular will occasionally be referred to as the triangular segments 44. In the case of bonding the honeycomb segments 34 and 44 to prepare a honeycomb segment bonded body 37, the triangular segments 44 are arranged at four corners of the honeycomb segment bonded body 37. In the triangular segments 44, spacers 41 in which a shape of an end face is triangular are arranged. Then, the quadrangular segments 34 and the triangular segments 44 are bonded via a bonding layer 36. The spacers 41 are arranged to apply force to the triangular segments 44 during the bonding, and a size of the spacers 41 is a little larger than that of the triangular segments 44. Thus, the size of the spacers 41 increases, so that it is possible to suitably apply, to the triangular segments 44, a sufficiently large force to suitably bond the honeycomb segments 34 and 44 to one another without peeling, during the bonding of the honeycomb segments 34 and 44.

Next, as show in FIG. 13(b), forces are applied from four directions of the honeycomb segment bonded body 37 during the bonding of the quadrangular segments 34 and the triangular segments 44. Specifically, as shown in FIG. 13(b), plate shape members 42 are arranged on respective side surfaces of the honeycomb segment bonded body 37 in the four directions, and the forces are applied to the plate shape members 42, respectively. In this case, the forces to be applied from the four directions are defined as different loads. For example, in the example of FIG. 13(b), a load to be applied from the upside to the downside of a paper space is adjusted to be larger than a load to be applied in another direction during the bonding. Thus, such steps are performed to cause an intentional positional shift to the triangular segments 44 arranged at the four corners in the honeycomb segment bonded body 37, so that it is possible to shift the bonding layer 36.

The forces to be applied from the four directions are adjusted to cause the shift of a necessary amount in the bonding layer 36, and then the plate shape members 42 and the spacers 41 are removed, thereby obtaining the honeycomb segment bonded body 37 as shown in FIG. 13(c).

Next, as shown in FIG. 13(d), it is preferable that a circumference of the obtained honeycomb segment bonded body 37 is processed, and a circumference coating material is coated on a processed surface of the processed honeycomb segment bonded body 37 to form an outer wall 38. As a material of the circumference coating material, for example, the same material as the bonding material is usable. It is possible to manufacture the honeycomb structure of the present invention as described above.

EXAMPLES

Example 1

Initially, 80 parts by mass of silicon carbide powder and 20 parts by mass of Si powder were mixed to obtain mixed powder. A binder, a pore former and water were added to this mixed powder, followed by mixing and kneading, to prepare a kneaded material.

Next, the kneaded material was extruded by using a honeycomb body forming die, to obtain a honeycomb formed body whose overall shape was a quadrangular pillar shape. 16 honeycomb formed bodies were prepared.

Then, the honeycomb formed bodies were dried with a microwave drier, and completely dried further with a hot air drier, and then both end faces of each honeycomb formed body were cut, to desirably adjust a dimension.

Next, plugging portions were formed in the dried honeycomb formed bodies. Specifically, initially, a mask was applied to an inflow end face of each honeycomb formed body, to cover inflow cells. Then, an end of the honeycomb formed body which was masked was immersed into a plugging slurry, to charge the plugging slurry into open ends of outflow cells which were not masked. Afterward, as to an outflow end face of the honeycomb formed body, the plugging slurry was also charged into open ends of inflow cells in the same manner as described above. Then, the honeycomb formed bodies, in which the plugging portions were formed, were further dried with the hot air drier.

Next, the honeycomb formed bodies, in which the plugging portions were formed, were degreased and fired, to obtain honeycomb segments. The degreasing was performed at 550° C. for 3 hours, and the firing was performed at 1450° C. in an argon atmosphere for 2 hours. An overall shape of each honeycomb segment was quadrangular prismatic columnar. A shape of each end face of the honeycomb segment was a square in which a length of one side was 36 mm. This honeycomb segment corresponds to "a complete segment" in the honeycomb structure. Table 2 shows a length of one side of this complete segment in a column of a "segment size".

Then, the obtained honeycomb segments were arranged so that side surfaces of the respective honeycomb segments adjacently faced each other, and were bonded in this state via a bonding material, to prepare a honeycomb bonded body. The honeycomb bonded body was bonded and prepared so that 16 honeycomb segments in total, i.e., 4 honeycomb segments in a longitudinal direction and 4 honeycomb segments in a transverse direction were arranged in each end face of the honeycomb bonded body. Table 1 shows the number of the honeycomb segments used in each example in a column of a "segment number". For example, when "4×4" is described in the column of the "segment number", it is meant that 16 honeycomb segments in total, i.e., 4 honeycomb segments in the longitudinal direction and 4 honeycomb segments in the transverse direction were used. In the case of bonding the honeycomb segments, an intentional shift was caused in a bonding layer by such a method as shown in FIG. 13.

Next, a circumferential surface of the obtained honeycomb bonded body was ground. Afterward, a circumference coating material was coated on a side surface of the ground honeycomb bonded body, to form a circumference coating layer. The honeycomb structure of Example 1 was prepared as described above.

In the honeycomb structure of Example 1, an overall shape of each end face was round and a diameter of the end face was 143.8 mm. Table 1 shows the overall shape of the end face of the honeycomb structure in a column of a "cross-sectional shape". Furthermore, Table 1 shows a diameter of the end face of the honeycomb structure in a column of a "diameter". A length of the honeycomb structure in a cell extending direction was 152.4 mm. Table 1 shows a length of the honeycomb structure in the cell extending direction in a column of a "total length". In each honeycomb segment, a partition wall thickness was 305 µm, a cell density was 46.5 cells/cm$^2$, and a partition wall porosity was 41%. The porosity was measured with a mercury porosimeter (AutoPore 9500 (tradename)) manufactured by Micromeritics Instrument Corp. Table 1 shows the respective results. In a shape of the cells defined by the partition walls in each honeycomb segment, quadrangular cells and octagonal cells were alternately arranged. As to this example where the honeycomb segments having such a cell shape were used, Table 1 shows "quadrangular, octagonal" in a column of a "cell shape".

In the obtained honeycomb structure, the bonding layer was disposed so that an outermost circumference bonding layer portion and at least one of the other bonding layer portions were not superimposed on each other on an extension line of one direction. Here, as to an arrangement of a row of the bonding layer, the arrangement of the bonding layer portions shown in FIG. 4 is defined as "a", the arrangement of the bonding layer portions shown in FIG. 6 is defined as "b", and the arrangement of the bonding layer portions shown in FIG. 7 is defined as "c". Furthermore, defined as "d" is an arrangement in which although two of the bonding layer portions are not superimposed on each other on the extension line of the one direction, the two bonding layer portions arranged so that the portions are not superimposed on each other do not include the outermost circumference bonding layer portion. Furthermore, defined as "e" is an arrangement in which among the bonding layer portions, there are not such two bonding layer portions arranged so that the portions are not superimposed on each other on the extension line of the one direction. In the present example, the arrangement of the row of the bonding layer was classified into 5 patterns a to e as the above-mentioned superimposing patterns between the bonding layer portions constituting the bonding layer.

In the honeycomb structure of Example 1, the arrangement of the row of the bonding layer was one of the arrangements a, b and c. Table 2 shows the arrangement of the row of the bonding layer in the honeycomb structure in a column of an "arrangement of row of bonding layer".

A width of each bonding layer portion was in a range of 0.5 to 1.5 mm. Furthermore, a maximum shift of side surfaces of the adjacent honeycomb segments which faced each other was 3 mm. Table 2 shows the maximum shift of the side surfaces of the adjacent honeycomb segments which faced each other in a column of a "maximum shift $Y_{MAX}$ of adjacent segments". Furthermore, Table 2 shows a percentage of a ratio of "the maximum shift $Y_{MAX}$ of the adjacent segments" to "a segment size Z" that is a length of one side of each complete segment, in a column of a "maximum shift ratio". When "the maximum shift ratio" is 10% or less, the maximum shift $Y_{MAX}$ of the side surfaces of the adjacent honeycomb segments which face each other is 10% or less to the length Z of one side of the side surface of the complete segment.

Examples 2 and 3

The procedure of Example 1 was repeated except that an arrangement of rows of a bonding layer was changed as shown in Table 2, to prepare honeycomb structures of Examples 2 and 3. In the honeycomb structure of Example 2, the arrangement of the row of the bonding layer was one of a and b. In the honeycomb structure of Example 3, the arrangement of the row of the bonding layer was one of b and c. A maximum shift $Y_{MAX}$ of side surfaces of adjacent honeycomb segments which faced each other was 2.5 mm in the honeycomb structure of Example 2, and 1 mm in the honeycomb structure of Example 3.

Examples 4 to 12

In each of Examples 4 to 12, a plurality of honeycomb segments were prepared as shown in a column of a cell structure in Table 1, and a honeycomb structure was prepared by using the prepared honeycomb segments. Table 1 shows the number of the honeycomb segments used in each example in a column of "a segment number". Table 2 shows "an arrangement of a row of a bonding layer", "a maximum shift $Y_{MAX}$ of adjacent segments" and "a maximum shift ratio" of each obtained honeycomb structure.

In each of Examples 6 and 7, a circumferential surface of a honeycomb bonded body obtained by bonding honeycomb segments was ground so that an overall shape of each end face was elliptic. Afterward, a circumference coating material was coated on a side surface of the ground honeycomb bonded body to form a circumference coating layer.

Comparative Examples 1 to 12

The procedure of Example 1 was repeated except that each honeycomb segment of a cell structure shown in Table 3 was prepared and an arrangement of rows of a bonding layer was changed as shown in Table 4, to prepare honeycomb structures of Comparative Examples 1 to 12. When the arrangement of the rows of the bonding layer included a pattern d or a pattern e, the rows included a bonding layer in which an outermost circumference bonding layer portion and one of the other bonding layer portions were superimposed on each other in an extension line of one direction. Furthermore, when "a maximum shift ratio" was in excess of 10%, a maximum shift $Y_{MAX}$ of side surfaces of adjacent honeycomb segments which faced each other was in excess of 10% to a length Z of one side of a side surface of a complete segment.

TABLE 1

| | Cell structure | | | | | | | | | |
|---|---|---|---|---|---|---|---|---|---|---|
| | Thickness of partition walls (μm) | Cell density (cells/cm$^2$) | Cell shape | Cross-sectional shape | Segment No. | Diameter (mm) | Long dia. (mm) | Short dia. (mm) | Total length (mm) | Porosity (%) |
| Example 1 | 305 | 46.5 | Quadrangular, octagonal | Round | 4 × 4 | 143.8 | — | — | 152.4 | 41 |
| Example 2 | 305 | 46.5 | Quadrangular, octagonal | Round | 4 × 4 | 143.8 | — | — | 152.4 | 41 |
| Example 3 | 305 | 46.5 | Quadrangular, octagonal | Round | 4 × 4 | 143.8 | — | — | 152.4 | 41 |
| Example 4 | 203 | 46.5 | Quadrangular, octagonal | Round | 5 × 5 | 190.5 | — | — | 203.2 | 41 |
| Example 5 | 203 | 46.5 | Quadrangular, octagonal | Round | 5 × 5 | 190.5 | — | — | 203.2 | 41 |
| Example 6 | 305 | 46.5 | Quadrangular | Elliptic | 6 × 3 | — | 198.0 | 102.0 | 178.0 | 52 |
| Example 7 | 305 | 46.5 | Quadrangular | Elliptic | 6 × 3 | — | 198.0 | 102.0 | 178.0 | 52 |
| Example 8 | 431 | 31 | Quadrangular | Round | 4 × 4 | 143.8 | — | — | 254.0 | 52 |
| Example 9 | 431 | 31 | Quadrangular | Round | 4 × 4 | 143.8 | — | — | 254.0 | 52 |
| Example 10 | 254 | 46.5 | Quadrangular, octagonal | Round | 7 × 7 | 266.7 | — | — | 305.0 | 63 |
| Example 11 | 254 | 46.5 | Quadrangular, octagonal | Round | 7 × 7 | 266.7 | — | — | 305.0 | 63 |
| Example 12 | 254 | 46.5 | Quadrangular, octagonal | Round | 7 × 7 | 266.7 | — | — | 305.0 | 63 |

TABLE 2

|  | Segment size Z (mm) | Maximum shift $Y_{MAX}$ of adjacent segments (mm) | Maximum shift ratio (%) | Arrangement of row of bonding layer | Thermal shock resistance (1) | Shearing strength |
|---|---|---|---|---|---|---|
| Example 1 | 36 | 3 | 8.3 | a, b, c | A | A |
| Example 2 | 36 | 2.5 | 6.9 | a, b | A | A |
| Example 3 | 36 | 1 | 2.8 | a, c | A | B |
| Example 4 | 39 | 3.5 | 9.0 | a, b, c | A | A |
| Example 5 | 39 | 1.5 | 3.8 | b, c | A | B |
| Example 6 | 36 | 2.8 | 7.8 | a | A | A |
| Example 7 | 36 | 1.8 | 5.0 | b, c | A | A |
| Example 8 | 37 | 3 | 8.1 | b | A | A |
| Example 9 | 37 | 0.5 | 1.4 | c | A | B |
| Example 10 | 42 | 3 | 7.1 | a, b | A | A |
| Example 11 | 42 | 4 | 9.5 | a, b, c | A | A |
| Example 12 | 42 | 1.5 | 3.6 | a, b, c | A | B |

TABLE 3

|  | Cell structure | | | | | | | | |
|---|---|---|---|---|---|---|---|---|---|
|  | Thickness of partition walls (μm) | Cell density (cells/cm$^2$) | Cell shape | Cross-sectional shape | Segment No. | Diameter (mm) | Long dia. (mm) | Short dia. (mm) | Total length (mm) | Porosity (%) |
| Comparative Example 1 | 305 | 46.5 | Quadrangular, octagonal | Round | 4 × 4 | 143.8 | — | — | 152.4 | 41 |
| Comparative Example 2 | 305 | 46.5 | Quadrangular, octagonal | Round | 4 × 4 | 143.8 | — | — | 152.4 | 41 |
| Comparative Example 3 | 305 | 46.5 | Quadrangular, octagonal | Round | 4 × 4 | 143.8 | — | — | 152.4 | 41 |
| Comparative Example 4 | 203 | 46.5 | Quadrangular, octagonal | Round | 5 × 5 | 190.5 | — | — | 203.2 | 41 |
| Comparative Example 5 | 203 | 46.5 | Quadrangular, octagonal | Round | 5 × 5 | 190.5 | — | — | 203.2 | 41 |
| Comparative Example 6 | 305 | 46.5 | Quadrangular | Elliptic | 6 × 3 | — | 198.0 | 102.0 | 178.0 | 52 |
| Comparative Example 7 | 305 | 46.5 | Quadrangular | Elliptic | 6 × 3 | — | 198.0 | 102.0 | 178.0 | 52 |
| Comparative Example 8 | 431 | 31 | Quadrangular | Round | 4 × 4 | 143.8 | — | — | 254.0 | 52 |
| Comparative Example 9 | 431 | 31 | Quadrangular | Round | 4 × 4 | 143.8 | — | — | 254.0 | 52 |
| Comparative Example 10 | 254 | 46.5 | Quadrangular, octagonal | Round | 7 × 7 | 266.7 | — | — | 305.0 | 63 |
| Comparative Example 11 | 254 | 46.5 | Quadrangular, octagonal | Round | 7 × 7 | 266.7 | — | — | 305.0 | 63 |
| Comparative Example 12 | 254 | 46.5 | Quadrangular, octagonal | Round | 7 × 7 | 266.7 | — | — | 305.0 | 63 |

TABLE 4

|  | Segment size Z (mm) | Maximum shift $Y_{MAX}$ of adjacent segments (mm) | Maximum shift ratio (%) | Arrangement of row of bonding layer | Thermal shock resistance (1) | Shearing strength |
|---|---|---|---|---|---|---|
| Comparative Example 1 | 36 | 0 | 0.0 | e | A | C |
| Comparative Example 2 | 36 | 18 | 50.0 | a, b, c | C | A |
| Comparative Example 3 | 36 | 3 | 8.3 | a, d | A | C |
| Comparative Example 4 | 39 | 0.1 | 0.3 | e | A | C |
| Comparative Example 5 | 39 | 10 | 25.6 | a, b, d | C | C |
| Comparative Example 6 | 36 | 0.2 | 0.6 | e | A | C |
| Comparative Example 7 | 36 | 15 | 41.7 | a, b, d | C | C |

TABLE 4-continued

|  | Segment size Z (mm) | Maximum shift $Y_{MAX}$ of adjacent segments (mm) | Maximum shift ratio (%) | Arrangement of row of bonding layer | Thermal shock resistance (1) | Shearing strength |
|---|---|---|---|---|---|---|
| Comparative Example 8 | 37 | 0.1 | 0.3 | d | A | C |
| Comparative Example 9 | 37 | 10 | 27.0 | a, b | C | A |
| Comparative Example 10 | 42 | 0.2 | 0.5 | a, d | A | C |
| Comparative Example 11 | 42 | 20 | 47.6 | a, b, c | C | A |
| Comparative Example 12 | 42 | 15 | 35.7 | c, d | C | C |

As to the obtained honeycomb structures of Examples 1 to 12 and Comparative Examples 1 to 12, evaluation was performed on "a thermal shock resistance (1)" and "a shearing strength" by the following methods. Table 2 and Table 4 show the evaluation results.

(Thermal Shock Resistance (1))

As the evaluation of the thermal shock resistance (1), a test described below was carried out for the honeycomb structures, and robust properties of the honeycomb structures were evaluated by judging whether or not cracks were generated in each tested honeycomb structure. Specifically, in an engine bench on which a diesel engine having a displacement of 2.2 L was mounted, soot was deposited at a ratio of 2 to 12 g/L in each of the honeycomb structures of the examples and comparative examples on operating conditions that an engine revolution number was 2000 rpm and an engine torque was 60 Nm. Afterward, a regeneration treatment was performed by post injection, and an inlet gas temperature of the honeycomb structure was raised. When pressure loss before and after the honeycomb structure started to drop, the post injection was stopped, and the engine was changed to an idle state. An amount of the soot deposited at this time was obtained on conditions that the highest temperature in a central portion of an outflow end face was adjusted at 1000° C. in accordance with respective standards of the examples, and in the example and comparative example having the same number, the test was carried out on conditions that the same amount of the deposited soot was obtained. Then, it was visually observed whether or not the cracks were generated on an outflow end face side and an inflow end face side of the honeycomb structure. When any cracks were not confirmed, the evaluation result was pass, and when the cracks were confirmed, the evaluation result was failure. On the basis of the result on each of the outflow end face side and the inflow end face side, the evaluation of the thermal shock resistance (1) was performed in accordance with the following evaluation criteria. In the evaluation of the thermal shock resistance (1), when the results on the inflow end face side and the outflow end face side were both "pass", the evaluation result was A. In the evaluation of the thermal shock resistance (1), when at least one of the results on the inflow end face side and the outflow end face side was "failure", the evaluation result was C. Table 2 and Table 4 show the evaluation results.

(Shearing Strength)

Figure 14:
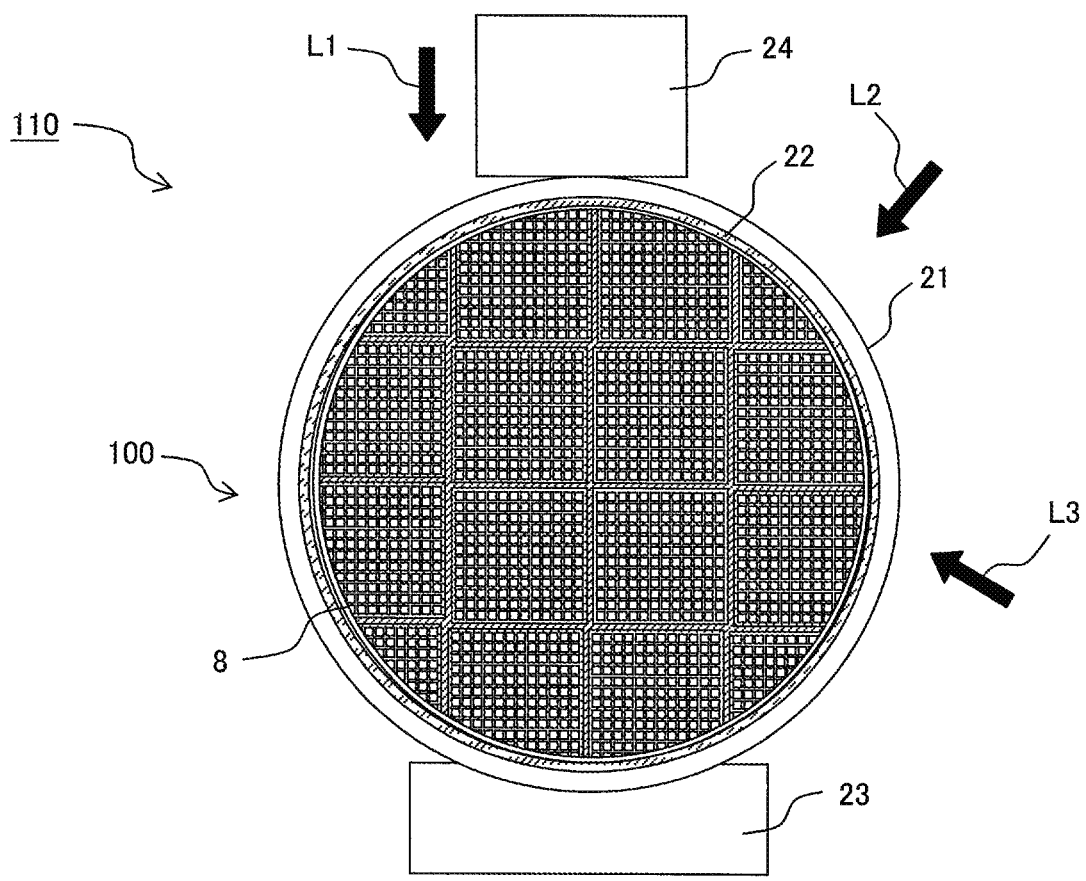
FIG. 14 is an explanatory view to explain a shearing strength test method.

The shearing strength was evaluated on each of the honeycomb structures of Examples 1 to 12 and Comparative Examples 1 to 12, by use of a shearing strength test device 110 shown in FIG. 14. Specifically, initially, a cushioning mat 22 was wound around an outer wall 8 of each honeycomb structure 100. Next, the honeycomb structure 100 wound with the cushioning mat 22 was inserted into a can member 21 made of a metal, to prepare a measurement sample for measurement of the shearing strength. As the mat 22, a ceramic mat (tradename: Maftec OBM-P) manufactured by Mitsubishi Plastics, Inc. was used. In the used mat 22, a mass per unit area was from 1000 to 1200 g/m² and a thickness was from 4.0 to 5.0 mm. A load was applied to the measurement sample prepared in this manner from each of a first load direction L1, a second load direction L2 and a third load direction L3, and there was measured a strength of the honeycomb structure 100 at which the structure was sheared. Each load was applied by pressing a load supply unit 24 to which a dial gauge was attached, onto an end in the vicinity of one end face of the can member 21 that was the measurement sample. The load to be applied to the measurement sample was confirmed by reading the applied load of a shearing strength test. The load to be applied to the measurement sample was gradually increased, and the load applied when the honeycomb structure 100 was sheared was obtained as the shearing strength of the honeycomb structure 100.

The evaluation of the shearing strength was performed in the following three stages A to C to the honeycomb structure of the comparative example that was a basis. When an improvement ratio of the shearing strength was 15% or more to the basis in each of the directions L1, L2 and L3, the evaluation result was A. When the improvement ratio of the shearing strength was 5% or more and smaller than 15%, the evaluation result was B. When the improvement ratio of the shearing strength was smaller than 5% or when any improvement of the shearing strength was not seen, the evaluation result was C. The basis mentioned here is as follows. As to Examples 1 to 3 and Comparative Examples 1 to 3, Comparative Example 1 is the basis. As to Examples 4 and 5 and Comparative Examples 4 and 5, Comparative Example 4 is the basis. As to Examples 6 and 7 and Comparative Examples 6 and 7, Comparative Example 6 is the basis. As to Examples 8 and 9 and Comparative Examples 8 and 9, Comparative Example 8 is the basis. As to Examples 10 to 12 and Comparative Examples 10 to 12, Comparative Example 10 is the basis. Table 2 and Table 4 show the evaluation results. It is to be noted that FIG. 14 is an explanatory view to explain the shearing strength test method. In FIG. 14, reference numeral 23 denotes a support base to support the can member 21, and reference numeral 24 denotes the load supply unit to apply the load to the measurement sample.

(Evaluation Result 1)

In the honeycomb structures of Examples 1 to 12, suitable results were obtainable in both of the evaluation of the thermal shock resistance (1) and the evaluation of the shearing strength. On the other hand, in the honeycomb structures of Comparative Examples 1, 3 to 8, 10 and 12, a large shearing strength drop was recognized in the evaluation of the shearing strength. In the honeycomb structures of Comparative Examples 1, 3 to 8, 10 and 12, the arrangement of the row of the bonding layer included the pattern d or the pattern e. Furthermore, in the honeycomb structures of Comparative Examples 2, 5, 7, 9, 11 and 12, the evaluation result of at least one of the inflow end face side and the outflow end face side was "failure" in the evaluation of the thermal shock resistance (1). In the honeycomb structures of Comparative Examples 2, 5, 7, 9, 11 and 12, "the maximum shift ratio" was in excess of 10%.

Examples 13 to 24

In Examples 13 to 24, a plurality of such honeycomb segments as shown in a column of a cell structure of Table 5 were prepared, and honeycomb structures were prepared by using the prepared honeycomb segments. Additionally, in Examples 13 to 24, the honeycomb structures were prepared in a state where any plugging portions were not arranged in cells of the prepared honeycomb segments. Additionally, in Example 13, the procedure of Example 1 was repeated except that any plugging portions were not arranged, to prepare the honeycomb structure. Similarly, the procedures of Examples 2 to 12 were repeated to prepare the honeycomb structures of Examples 14 to 24 in this order.

Comparative Examples 13 to 24

In Comparative Examples 13 to 24, a plurality of such honeycomb segments as shown in a column of a cell structure of Table 7 were prepared, and honeycomb structures were prepared by using the prepared honeycomb segments. Additionally, in Comparative Examples 13 to 24, the honeycomb structures were prepared in a state where any plugging portions were not arranged in cells of the prepared honeycomb segments. Additionally, in Comparative Example 13, the procedure of Comparative Example 1 was repeated except that any plugging portions were not arranged, to prepare the honeycomb structure. Similarly, the procedures of Comparative Examples 2 to 12 were repeated to prepare the honeycomb structures of Comparative Examples 14 to 24 in this order.

TABLE 5

| | Cell structure | | | | | | | | | |
|---|---|---|---|---|---|---|---|---|---|---|
| | Thickness of partition walls (μm) | Cell density (cells/cm$^2$) | Cell shape | Cross-sectional shape | Segment No. | Diameter (mm) | Long dia. (mm) | Short dia. (mm) | Total length (mm) | Porosity (%) |
| Example 13 | 305 | 46.5 | Quadrangular, octagonal | Round | 4 × 4 | 143.8 | — | — | 152.4 | 41 |
| Example 14 | 305 | 46.5 | Quadrangular, octagonal | Round | 4 × 4 | 143.8 | — | — | 152.4 | 41 |
| Example 15 | 305 | 46.5 | Quadrangular, octagonal | Round | 4 × 4 | 143.8 | — | — | 152.4 | 41 |
| Example 16 | 203 | 46.5 | Quadrangular, octagonal | Round | 5 × 5 | 190.5 | — | — | 203.2 | 41 |
| Example 17 | 203 | 46.5 | Quadrangular, octagonal | Round | 5 × 5 | 190.5 | — | — | 203.2 | 41 |
| Example 18 | 305 | 46.5 | Quadrangular | Elliptic | 6 × 3 | — | 198.0 | 102.0 | 178.0 | 52 |
| Example 19 | 305 | 46.5 | Quadrangular | Elliptic | 6 × 3 | — | 198.0 | 102.0 | 178.0 | 52 |
| Example 20 | 431 | 31 | Quadrangular | Round | 4 × 4 | 143.8 | — | — | 254.0 | 52 |
| Example 21 | 431 | 31 | Quadrangular | Round | 4 × 4 | 143.8 | — | — | 254.0 | 52 |
| Example 22 | 254 | 46.5 | Quadrangular, octagonal | Round | 7 × 7 | 266.7 | — | — | 305.0 | 63 |
| Example 23 | 254 | 46.5 | Quadrangular, octagonal | Round | 7 × 7 | 266.7 | — | — | 305.0 | 63 |
| Example 24 | 254 | 46.5 | Quadrangular, octagonal | Round | 7 × 7 | 266.7 | — | — | 305.0 | 63 |

TABLE 6

| | Segment size Z (mm) | Maximum shift $Y_{MAX}$ of adjacent segments (mm) | Maximum shift ratio (%) | Arrangement of row of bonding layer | Thermal shock resistance (1) | Shearing strength |
|---|---|---|---|---|---|---|
| Example 13 | 36 | 3 | 8.3 | a, b, c | A | A |
| Example 14 | 36 | 2.5 | 6.9 | a, b | A | A |
| Example 15 | 36 | 1 | 2.8 | a, c | A | B |
| Example 16 | 39 | 3.5 | 9.0 | a, b, c | A | A |
| Example 17 | 39 | 1.5 | 3.8 | b, c | A | B |
| Example 18 | 36 | 2.8 | 7.8 | a | A | A |
| Example 19 | 36 | 1.8 | 5.0 | b, c | A | A |
| Example 20 | 37 | 3 | 8.1 | b | A | A |
| Example 21 | 37 | 0.5 | 1.4 | c | A | B |
| Example 22 | 42 | 3 | 7.1 | a, b | A | A |
| Example 23 | 42 | 4 | 9.5 | a, b, c | A | A |
| Example 24 | 42 | 1.5 | 3.6 | a, b, c | A | B |

TABLE 7

| | Cell structure | | | | | | | | | |
|---|---|---|---|---|---|---|---|---|---|---|
| | Thickness of partition walls (μm) | Cell density (cells/cm$^2$) | Cell shape | Cross-sectional shape | Segment No. | Diameter (mm) | Long dia. (mm) | Short dia. (mm) | Total length (mm) | Porosity (%) |
| Comparative Example 13 | 305 | 46.5 | Quadrangular, octagonal | Round | 4 × 4 | 143.8 | — | — | 152.4 | 41 |
| Comparative Example 14 | 305 | 46.5 | Quadrangular, octagonal | Round | 4 × 4 | 143.8 | — | — | 152.4 | 41 |
| Comparative Example 15 | 305 | 46.5 | Quadrangular, octagonal | Round | 4 × 4 | 143.8 | — | — | 152.4 | 41 |
| Comparative Example 16 | 203 | 46.5 | Quadrangular, octagonal | Round | 5 × 5 | 190.5 | — | — | 203.2 | 41 |
| Comparative Example 17 | 203 | 46.5 | Quadrangular, octagonal | Round | 5 × 5 | 190.5 | — | — | 203.2 | 41 |
| Comparative Example 18 | 305 | 46.5 | Quadrangular | Elliptic | 6 × 3 | — | 198.0 | 102.0 | 178.0 | 52 |
| Comparative Example 19 | 305 | 46.5 | Quadrangular | Elliptic | 6 × 3 | — | 198.0 | 102.0 | 178.0 | 52 |
| Comparative Example 20 | 431 | 31 | Quadrangular | Round | 4 × 4 | 143.8 | — | — | 254.0 | 52 |
| Comparative Example 21 | 431 | 31 | Quadrangular | Round | 4 × 4 | 143.8 | — | — | 254.0 | 52 |
| Comparative Example 22 | 254 | 46.5 | Quadrangular, octagonal | Round | 7 × 7 | 266.7 | — | — | 305.0 | 63 |
| Comparative Example 23 | 254 | 46.5 | Quadrangular, octagonal | Round | 7 × 7 | 266.7 | — | — | 305.0 | 63 |
| Comparative Example 24 | 254 | 46.5 | Quadrangular, octagonal | Round | 7 × 7 | 266.7 | — | — | 305.0 | 63 |

TABLE 8

| | Segment size Z (mm) | Maximum shift $Y_{MAX}$ of adjacent segments (mm) | Maximum shift ratio (%) | Arrangement of row of bonding layer | Thermal shock resistance (1) | Shearing strength |
|---|---|---|---|---|---|---|
| Comparative Example 13 | 36 | 0 | 0.0 | e | A | C |
| Comparative Example 14 | 36 | 18 | 50.0 | a, b, c | C | A |
| Comparative Example 15 | 36 | 3 | 8.3 | a, d | A | C |
| Comparative Example 16 | 39 | 0.1 | 0.3 | e | A | C |
| Comparative Example 17 | 39 | 10 | 25.6 | a, b, d | C | C |
| Comparative Example 18 | 36 | 0.2 | 0.6 | e | A | C |
| Comparative Example 19 | 36 | 15 | 41.7 | a, b, d | C | C |
| Comparative Example 20 | 37 | 0.1 | 0.3 | d | A | C |
| Comparative Example 21 | 37 | 10 | 27.0 | a, b | C | A |
| Comparative Example 22 | 42 | 0.2 | 0.5 | a, d | A | C |
| Comparative Example 23 | 42 | 20 | 47.6 | a, b, c | C | A |
| Comparative Example 24 | 42 | 15 | 35.7 | c, d | C | C |

As to the obtained honeycomb structures of Examples 13 to 24 and Comparative Examples 13 to 24, evaluation was performed on "a thermal shock resistance (2)" and "a shearing strength". An evaluation method of "the thermal shock resistance (2)" concerning Examples 13 to 24 and Comparative Examples 13 to 24 was as follows. Furthermore, an evaluation method of "the shearing strength" concerning Examples 13 to 24 and Comparative Examples 13 to 24 was similar to the evaluation method in Example 1. As to evaluation criteria and the like of the respective evaluations, those of the honeycomb structures of Examples 13 to 24 correspond to those of the honeycomb structures of Examples 1 to 12 in this order, and those of the honeycomb structures of Comparative Examples 13 to 24 correspond to those of the honeycomb structures of Comparative Examples 1 to 12 in this order. Table 6 and Table 8 show the evaluation results.

(Thermal Shock Resistance (2))

The thermal shock resistance (2) of the honeycomb structure was evaluated by using "a propane gas burner device" capable of supplying a heating gas into a can member to store the honeycomb structure. Specifically, the honeycomb structure of each example was stored (canned) in the can member, and the can member was installed in the above propane gas burner device. Next, a burning gas was passed through the honeycomb structure. Initially, the burning gas was passed at a flow rate of 60 NL/min for 10 minutes. A gas temperature of a central portion at a position of 10 mm in front of the honeycomb structure was 1100° C. after 10 minutes. Afterward, the passing of the burning gas was stopped, and in place of the burning gas, cooling air was passed at a flow rate of 250 NL/min for 10 minutes. When the cooling air was passed, the gas temperature in the central portion at the position of 10 mm in front of the honeycomb structure after 10 minutes was 100° C. Such passing of the burning gas and the cooling air was defined as one cycle, and this passing was performed as much as 20 cycles. Afterward, it was visually observed whether or not the cracks were generated on an outflow end face side and an inflow end face side of the honeycomb structure. When any cracks were not confirmed, the evaluation result was pass, and when the cracks were confirmed, the evaluation result was failure. On the basis of the result on each of the outflow end face side and the inflow end face side, the evaluation of the thermal shock resistance (2) was performed in accordance with the following evaluation criteria. In the evaluation of the thermal shock resistance (2), when the results on the inflow end face side and the outflow end face side were both "pass", the evaluation result was A. In the evaluation of the thermal shock resistance (2), when at least one of the results on the inflow end face side and the outflow end face side was "failure", the evaluation result was C.

(Evaluation Result 2)

In the honeycomb structures of Examples 13 to 24, suitable results were obtainable in both of the evaluation of the thermal shock resistance (2) and the evaluation of the shearing strength. On the other hand, in the honeycomb structures of Comparative Examples 13, 15 to 20, 22 and 24, a large shearing strength drop was recognized in the evaluation of the shearing strength. In the honeycomb structures of Comparative Examples 13, 15 to 20, 22 and 24, the arrangement of the row of the bonding layer included the pattern d or the pattern e. Furthermore, in the honeycomb structures of Comparative Examples 14, 17, 19, 21, 23 and 24, the evaluation result of at least one of the inflow end face side and the outflow end face side was "failure" in the evaluation of the thermal shock resistance (2). In the honeycomb structures of Comparative Examples 14, 17, 19, 21, 23 and 24, "the maximum shift ratio" was in excess of 10%.

A honeycomb structure of the present invention is especially effectively usable in a use application of an exhaust gas purification treatment device or the like to perform a purification treatment of particulate matter of particulates and the like included in a fluid of an exhaust gas or the like emitted from a diesel engine, a gasoline engine or the like.

DESCRIPTION OF REFERENCE NUMERALS

1: partition wall, 2: cell, 2a: inflow cell, 2b: outflow cell, 3: segment circumferential wall, 4: honeycomb segment, 4a: complete segment, 4b: incomplete segment, 5: plugging portion, 6: bonding layer, 7: honeycomb segment bonded body, 8: outer wall, 11: inflow end face, 12: outflow end face, 16, 16a, 16b, 16c and 16d: bonding layer portion, 16x: outermost circumference bonding layer portion, 21: can member, 22: mat, 23: support base, 24: load supply unit, 34: honeycomb segment (quadrangular segment), 36: bonding layer, 37: honeycomb segment bonded body, 38: outer wall, 41: spacer, 42: plate shape member, 44: honeycomb segment (triangular segment), 100 and 200: honeycomb structure, 110: shearing strength test device, L1: first load direction, L2: second load direction, L3: third load direction, T1: width of the bonding layer portion, T2: width of the bonding layer, and X: direction (one direction).

What is claimed is:

1. A honeycomb structure comprising:
a plurality of prismatic columnar honeycomb segments each having porous partition walls defining a plurality of cells extending from an inflow end face into which a fluid flows to an outflow end face out of which the fluid flows, and a segment circumferential wall disposed at an outermost circumference; and
a bonding layer which bonds side surfaces of the plurality of honeycomb segments to one another,
wherein the plurality of honeycomb segments include a plurality of complete segments having the same cross-sectional shape in a cross section perpendicular to an extending direction of the cells, and a plurality of incomplete segments each having a cross-sectional shape of a part of the cross-sectional shape of the complete segment,
the bonding layer has a plurality of rows in each of which a plurality of bonding layer portions each disposed between two honeycomb segments arranged to face each other are arranged to extend from one point of a peripheral edge of a bonded body of the honeycomb segments to the other point thereof, in the cross section perpendicular to the extending direction of the cells,
the bonding layer of each of the plurality of rows is disposed so that among the plurality of bonding layer portions arranged in one direction, an outermost circumference bonding layer portion disposed at the outermost circumference in the cross section and at least one of the other bonding layer portions arranged in the one direction are not superimposed on each other on an extension line of the one direction, and
in each of the plurality of honeycomb segments, a ratio of shift of side surfaces of adjacent honeycomb segments which face each other to a length of one side of a side surface of the complete segment is from 1.4% or more to 10% or less.

2. The honeycomb structure according to claim 1, wherein a width of the bonding layer portion is from 0.5 to 3.0 mm.

3. The honeycomb structure according to claim 2, further comprising plugging portions arranged to plug one of open ends of each of the cells formed in the honeycomb segments.

4. The honeycomb structure according to claim 1, further comprising plugging portions arranged to plug one of open ends of each of the cells formed in the honeycomb segments.

* * * * *